(12) United States Patent
Fujikawa et al.

(10) Patent No.: US 11,796,025 B2
(45) Date of Patent: Oct. 24, 2023

(54) VALVE MECHANISM AND SHOCK ABSORBER

(71) Applicant: Showa Corporation, Gyoda (JP)

(72) Inventors: Yosuke Fujikawa, Fukuroi (JP); Yosuke Murakami, Fukuroi (JP)

(73) Assignee: HITACHI ASTEMO, LTD., Hitachinaka (JP)

( * ) Notice: Subject to any disclaimer, the term of this patent is extended or adjusted under 35 U.S.C. 154(b) by 458 days.

(21) Appl. No.: 17/031,167

(22) Filed: Sep. 24, 2020

(65) Prior Publication Data

US 2021/0003189 A1 Jan. 7, 2021

Related U.S. Application Data

(63) Continuation of application No. PCT/JP2018/023509, filed on Jun. 20, 2018.

(51) Int. Cl.
*F16F 9/34* (2006.01)
*F16F 9/50* (2006.01)
(Continued)

(52) U.S. Cl.
CPC ............... *F16F 9/348* (2013.01); *F16F 9/18* (2013.01); *F16F 9/50* (2013.01); *F16K 11/105* (2013.01);
(Continued)

(58) Field of Classification Search
CPC ...... F16F 9/348; F16F 9/18; F16F 9/50; F16F 9/58; F16F 9/585; F16F 9/346;
(Continued)

(56) References Cited

U.S. PATENT DOCUMENTS 4,635,683 A * 1/1987 Nielsen ................ H01F 7/1638
251/129.08
5,398,787 A * 3/1995 Woessner ............... B60G 17/08
188/315
(Continued)

FOREIGN PATENT DOCUMENTS

JP 2013-011342 A 1/2013
JP 2014-512494 A 5/2014
(Continued)

OTHER PUBLICATIONS

International Search Report dated Aug. 28, 2018 for the corresponding PCT International Patent Application No. PCT/JP2018/023509.
(Continued)

*Primary Examiner* — Robert A. Siconolfi
*Assistant Examiner* — James K Hsiao
(74) *Attorney, Agent, or Firm* — Leason Ellis LLP; Edward J. Ellis; Melvin C. Garner

(57) ABSTRACT

A valve mechanism includes: a cylindrical body; a plurality of valve bodies; and a drive valve. The drive valve includes a shaft portion having therein a flow path penetrating in the axial direction, and a step portion extending from an outer peripheral surface of the shaft portion to a radial outside of the shaft portion. The shaft portion has a tip portion which extends further on the cylindrical body side than the step portion. An outer diameter of the tip portion is smaller than an outer diameter of the step portion. A gap between the valve bodies is changed by elastically deforming an inner peripheral portion of the valve body, which comes into contact with the drive valve moved in a direction approaching the valve body, in a direction approaching the cylindrical body with respect to an outer peripheral portion of the valve body.

20 Claims, 15 Drawing Sheets

(51) Int. Cl.
*F16F 9/18* (2006.01)
*B62K 25/28* (2006.01)
*F16F 9/348* (2006.01)
*F16K 11/10* (2006.01)
*B62K 25/04* (2006.01)
*F16F 9/06* (2006.01)
*F16F 9/32* (2006.01)
*F16F 9/346* (2006.01)
*F16F 9/58* (2006.01)

(52) U.S. Cl.
CPC ...... *B62K 25/283* (2013.01); *B62K 2025/044* (2013.01); *F16F 9/065* (2013.01); *F16F 9/3257* (2013.01); *F16F 9/346* (2013.01); *F16F 9/58* (2013.01); *F16F 9/585* (2013.01); *F16F 2222/12* (2013.01); *F16F 2224/025* (2013.01); *F16F 2228/066* (2013.01); *F16F 2232/08* (2013.01); *F16F 2234/02* (2013.01)

(58) Field of Classification Search
CPC ...... F16F 9/3257; F16F 9/065; F16F 2222/12; F16F 2224/025; F16F 2228/066; F16F 2232/08; F16F 2234/02; B62K 25/283; B62K 2025/044
See application file for complete search history.

(56) References Cited

U.S. PATENT DOCUMENTS

| | | | | |
|---|---|---|---|---|
| 5,551,541 | A * | 9/1996 | Forster | F16F 9/34 188/315 |
| 5,937,975 | A * | 8/1999 | Forster | F16F 9/463 188/266.6 |
| 6,000,508 | A * | 12/1999 | Forster | F16F 9/46 188/299.1 |
| 6,044,939 | A * | 4/2000 | Forster | F16F 9/50 188/266.6 |
| 8,136,644 | B2 * | 3/2012 | Sonsterod | B60G 17/056 188/266.5 |
| 9,188,186 | B2 * | 11/2015 | Hovén | F16F 9/464 |
| 9,366,270 | B2 * | 6/2016 | Wimmer | F16F 9/465 |
| 9,616,728 | B2 * | 4/2017 | Marking | F16F 9/19 |
| 9,670,982 | B2 * | 6/2017 | Sönsteröd | F16F 9/465 |
| 10,047,817 | B2 * | 8/2018 | Ericksen | B60G 17/0161 |
| 10,731,724 | B2 * | 8/2020 | Laird | F16F 9/34 |
| 11,549,565 | B2 * | 1/2023 | Ericksen | B60G 17/0161 |
| 2008/0116024 | A1 * | 5/2008 | Heyn | F16F 9/465 188/322.13 |
| 2011/0203888 | A1 * | 8/2011 | Sonsterod | F16F 9/464 188/322.13 |
| 2012/0305349 | A1 | 12/2012 | Murakami et al. | |
| 2014/0008556 | A1 | 1/2014 | Ewers et al. | |
| 2014/0291088 | A1 | 10/2014 | Katayama et al. | |
| 2017/0284496 | A1 | 10/2017 | Miwa et al. | |

FOREIGN PATENT DOCUMENTS

| | | |
|---|---|---|
| JP | 2014-199076 A | 10/2014 |
| JP | 2017-180606 A | 10/2017 |
| JP | 2017-180607 A | 10/2017 |

OTHER PUBLICATIONS

Extended European Search Report dated Jan. 19, 2022 for the corresponding European Patent Application No. 18923647.4, 11 pages.

* cited by examiner

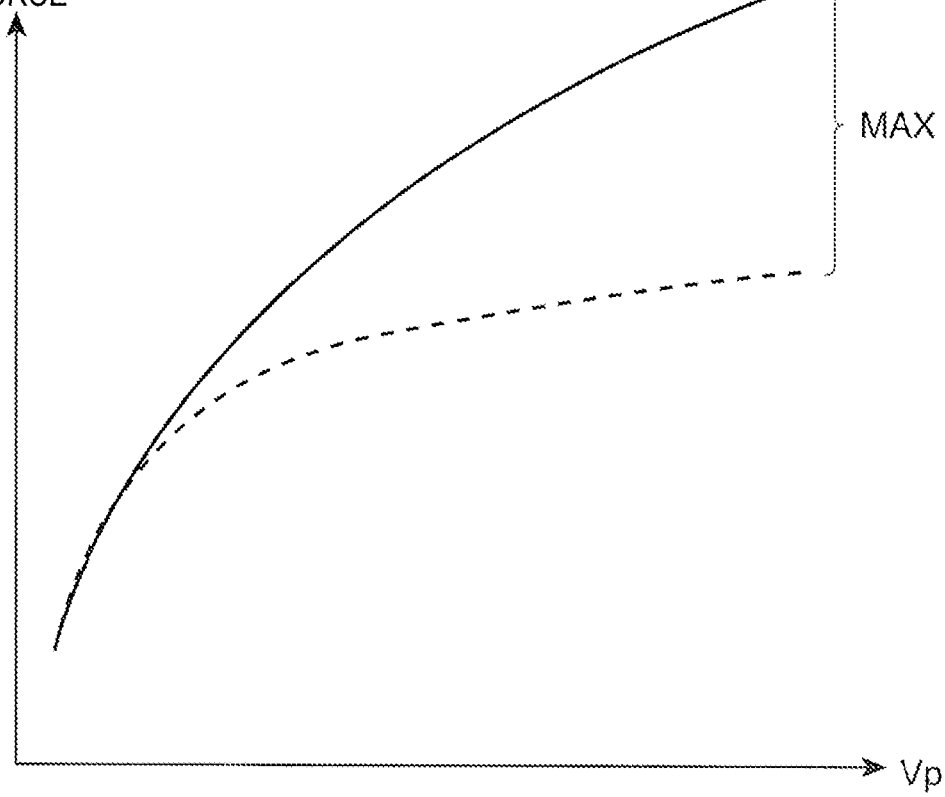

FIRST END ←——→ SECOND END

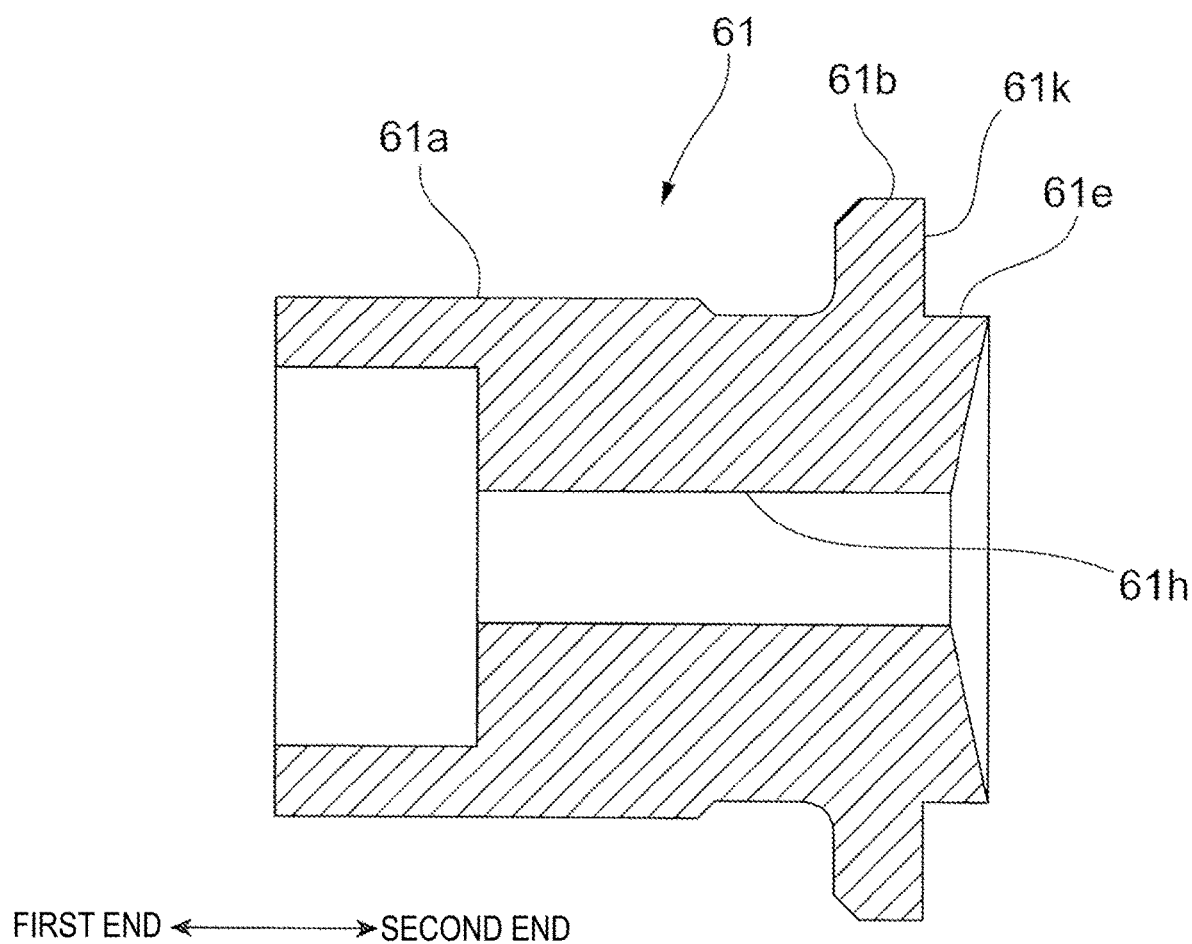

FIRST END ←----→ SECOND END

FIRST END ← → SECOND END

FIRST END ←──────→ SECOND END

VALVE MECHANISM AND SHOCK ABSORBER

CROSS-REFERENCE TO RELATED APPLICATION(S)

This application is a continuation of PCT application No. PCT/JP2018/023509, which was filed on Jun. 20, 2018, the content of which is incorporated herein by reference in its entirety.

FIELD OF THE INVENTION

The present invention relates to a valve mechanism and a shock absorber.

BACKGROUND OF THE INVENTION

Suspension systems for vehicles such as automobiles are equipped with a shock absorber which uses a damping force generation mechanism to appropriately reduce vibration transmitted from the road surface to vehicle body during traveling and improve ride comfort and steering stability. The shock absorber has a flow path through which fluid flows. In some cases, a valve body, which forms a part of the flow path, is elastically deformed by being pressed by a drive unit, thereby controlling a flow path area to adjust a damping force.

For example, Patent Literature 1 discloses a control valve portion which includes a valve seat member having a valve seat formed radially outside an opening at one end of a central flow path for oil, a drive valve provided so as to be movable in a direction of approaching or separating with respect to the valve seat, a plurality of valve bodies provided between the valve seat and the drive valve and having opening portions through which oil flows, a solenoid actuator which changes a gap flow path between an inner peripheral portion of the valve body and the valve seat by moving the drive valve in a direction to approach the valve seat and elastically deforming a valve body of the plurality of valve bodies, which is the valve body closest to the drive valve, in a direction in which an inner peripheral portion thereof approaches the valve seat with respect to an outer peripheral portion of the valve body, and a valve rotation restricting portion which restricts relative rotation of the plurality of valve bodies in a circumferential direction in a state where the openings of the plurality of valve bodies communicate with each other.

Patent Literature 1: JP-A-2017-180606

When the valve body is pressed and elastically deformed by the drive unit to control the flow path area, the pressure tends to change due to the jet of the fluid, so that a desired damping force may not be obtained.

An object of the invention is to provide a valve mechanism or the like which can easily obtain a desired damping force.

In a control valve portion of the related art as disclosed in Patent Literature 1, by providing a difference in a pressure receiving area for receiving the fluid pressure between one end side and the other end side, a thrust for moving the drive valve downward is generated. In order to control the damping force with high accuracy, it is important to control the thrust of the drive valve with high accuracy. Therefore, in controlling the damping force, it is important to control the difference between the pressure receiving areas described above. The present inventors have investigated the characteristics of a shock absorber having the control valve portion of the related art. As a result, it is found that, in the shock absorber of the related art, (1) when the fluid flows at a high flow rate from a lower side to an upper side of the drive valve during the extension stroke in which the overall length of the shock absorber extends, the fluid enters between the valve bodies, and therefore the pressure receiving area may fluctuate from the designed value. Therefore, countermeasures to solve this are examined. As a result, the inventor has found that, by providing a step portion extending radially outward of a shaft portion of the drive valve, it is possible to prevent the flow of the fluid which tries to enter between the valve bodies. The invention has been completed based on such findings. Hereinafter, the invention will be described.

SUMMARY OF THE INVENTION

Under such a purpose, an aspect of the invention completed is a valve mechanism which includes a cylindrical body having a hollow portion penetrating in an axial direction, a plurality of valve bodies including a first valve body having a through-hole penetrating in the axial direction and being arranged to be in contact with an axial end surface of the cylindrical body, and a drive valve arranged movably in the axial direction and disposed on a side opposite to the cylindrical body with respect to the plurality of valve bodies, where the drive valve includes a shaft portion having therein a flow path penetrating in the axial direction and a step portion extending from an outer peripheral surface of the shaft portion to a radial outside of the shaft portion and the shaft portion has a tip portion which extends further on the cylindrical body side than the step portion, and further an outer diameter of the tip portion is smaller than an outer diameter of the step portion, and still further a gap between the plurality of valve bodies is changed by elastically deforming an inner peripheral portion of the valve body, which comes into contact with the drive valve which is moved in a direction approaching the valve body, in a direction approaching the cylindrical body with respect to an outer peripheral portion of the valve body.

Here, the step portion may be in contact with a second valve body which is included in the plurality of valve bodies and disposed closest to the drive valve side and the tip portion may be in contact with the valve body which is arranged further on the cylindrical body side than the second valve body. This makes it easier to control the flow path area.

A spacer may be provided between the first valve body and the second valve body. As a result, a radial flow path can be formed in the valve body.

Further, the tip portion may have an annular recess portion on an end surface on the cylindrical body side. Thereby, the contact area between the tip portion and the valve body can be reduced.

The step portion may have an annular shape. This makes it easier to form the step portion.

The hollow portion may have an orifice portion of which inner diameter increases as it approaches the valve body. This makes it difficult for the cylindrical body to obstruct the flow of the fluid.

The cylindrical body may have an upper end portion which is in contact with the valve body. Thereby, in an extension stroke, a change in the pressure receiving area due to the ejection of the fluid can be suppressed.

The valve body may have an annular outer frame portion, an annular inner frame portion arranged radially inward of the outer frame portion, and a plurality of spoke portions connecting the outer frame portion and the inner frame portion and the plurality of spoke portions may be spaced apart from each other. Thereby, a plurality of axial flow paths can be formed in the valve body.

The plurality of valve bodies may be three or more valve bodies. This makes it easier to control the flow path area.

The invention is a shock absorber which includes the valve mechanism described above, a cylinder which accommodates fluid, a piston which is slidably fitted in the cylinder, a piston rod which is connected to the piston and extends out of the cylinder, and an oil reservoir for compensating for an oil amount corresponding to an entering volume of the piston rod when the piston rod enters the cylinder, where the fluid flowing due to the sliding of the piston moves into the valve mechanism to generate a damping force and the fluid having passed through the valve mechanism can flow through the oil reservoir.

In the shock absorber described above, a damping force generating mechanism which is provided independently of the valve mechanism and generates a damping force due to the flow of the fluid may be further provided and the fluid which has passed through the damping force generating mechanism can flow through the oil reservoir. Thus, the damping force can be adjusted by the valve mechanism.

Advantageous Effects of Invention

According to an aspect of the invention, it is possible to provide a valve mechanism or the like which can easily obtain a desired damping force.

BRIEF DESCRIPTION OF THE DRAWINGS

FIG. 8 is a diagram illustrating a damping characteristic in an extension stroke.

FIG. 9B is a view illustrating various shapes of the drive valve.

DETAILED DESCRIPTION OF THE INVENTION

Hereinafter, embodiments for implementing a valve mechanism, a damping force generator, and a shock absorber according to the invention will be described with reference to the accompanying drawings. However, the invention is not limited to only those embodiments.

Description of Overall Configuration of Shock Absorber 10

Figure 1:
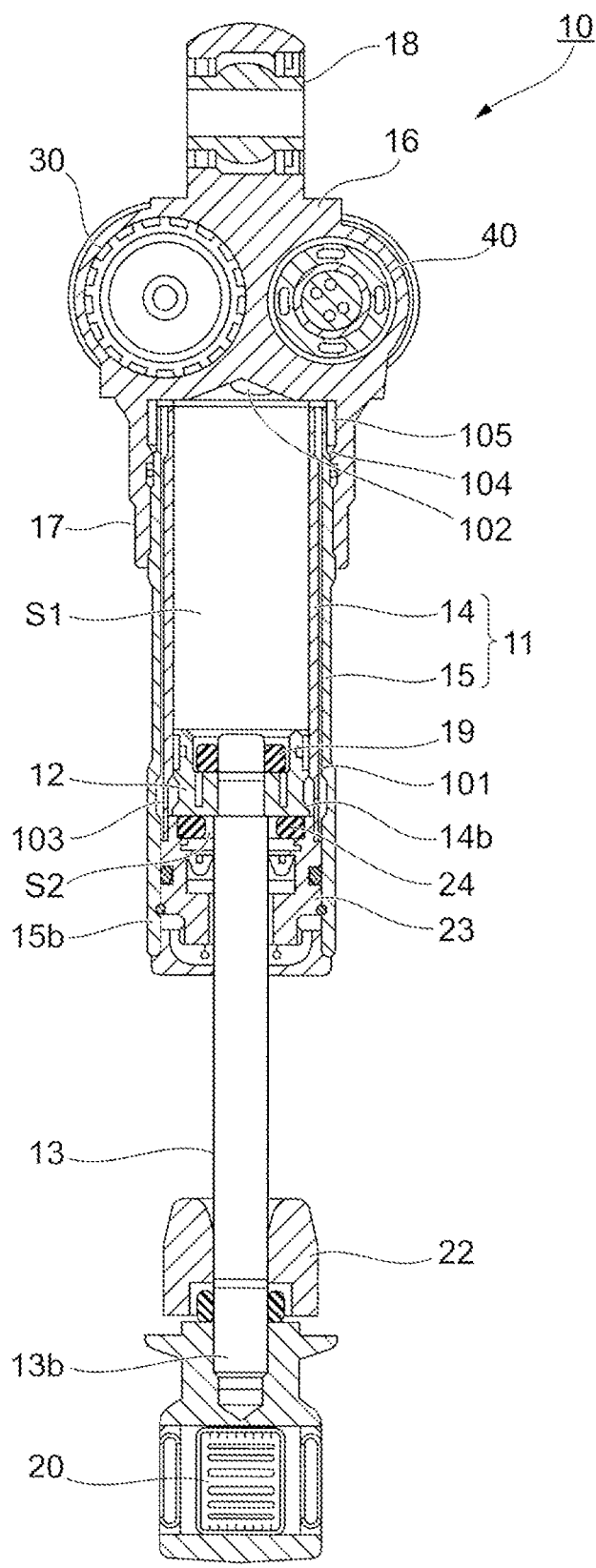
FIG. 1 is a cross-sectional view illustrating an overall configuration of a shock absorber according to an embodiment.

FIG. 1 is a cross-sectional view illustrating an overall configuration of a shock absorber 10 according to the embodiment.

As illustrated in FIG. 1, the shock absorber 10 is provided, for example, between a vehicle body of a motorcycle and a rear wheel supporting portion which supports a rear wheel and buffers shock and vibration input from the rear wheel. In the following description, the shock absorber 10 extends in an up-down direction. In the shock absorber 10, a vehicle-body-side mounting portion 18 provided at an upper end thereof is connected to the vehicle body side and an axle-side mounting member 20 provided at a lower end thereof is connected to the rear wheel side. However, the invention does not exclude a case where the shock absorber 10 is provided so as to extend in, for example, a lateral direction (substantially horizontal direction).

The shock absorber 10 includes a cylinder 11, a piston 12, a piston rod 13, a reservoir 30, a damping force generator 40, and a spring (not illustrated).

The cylinder 11 accommodates oil, which is an example of a fluid. The cylinder 11 is formed by an inner cylinder 14 and an outer cylinder 15 which form a concentric double pipe. On an upper end side of the shock absorber 10, a damper case 16 provided with the vehicle-body-side mounting portion 18 is arranged. The damper case 16 is provided with a cylindrical cylinder holding portion 17 extending toward the cylinder 11. The upper ends of the outer cylinder 15 and the inner cylinder 14 are inserted into and held by the cylinder holding portion 17.

The inner diameter of the outer cylinder 15 of the cylinder 11 is formed to be larger by a certain dimension than the outer diameter of the inner cylinder 14. As a result, a cylindrical flow path 101 is formed between the outer cylinder 15 and the inner cylinder 14.

The outer cylinder 15 is formed so as to protrude below a lower end portion 14b of the inner cylinder 14 by a predetermined dimension. Inside a lower end portion 15b of the outer cylinder 15, an annular rod guide 23 which supports the piston rod 13 so as to be slidable in a center axis direction (up-down direction in FIG. 1) is provided. The lower end portion 14b of the inner cylinder 14 abuts on the upper surface of the rod guide 23, whereby the lower end of the flow path 101 is closed.

A rebound rubber 24 is provided on the upper side of the rod guide 23 to absorb the impact when the piston 12 collides.

The piston 12 is fixed to an end of the piston rod 13. Further, the piston 12 is provided in contact with the cylinder 11 so as to be movable in an axial direction (up-down direction in FIG. 1) of the cylinder 11 and defines a space inside the cylinder 11. The piston 12 is fitted inside the inner cylinder 14 of the cylinder 11 so as to be slidable along a center axis direction (up-down direction in FIG. 1) of the inner cylinder 14. By the piston 12, the inner space of the inner cylinder 14 of the cylinder 11 is partitioned into a piston-side oil chamber S1 formed on the damper case 16 side and a rod-side oil chamber S2 formed on the piston rod 13 side.

An oil hole 102 is formed in the damper case 16 at a position facing an upper end opening of the inner cylinder 14 and opens into the piston side oil chamber S1. The oil hole 102 communicates with a first oil chamber S11 (see FIG. 3) of the damping force generator 40 described below.

A plurality of oil holes 103 are formed in the lower end portion 14b of the inner cylinder 14 and the oil holes 103 allow the rod-side oil chamber S2 to communicate with the flow path 101.

Further, at the upper end of the flow path 101, a plurality of oil holes 104 are formed in the outer cylinder 15 at a portion facing the cylinder holding portion 17. Those oil holes 104 allow the piston-side oil chamber S1 to communicate with the flow path 101.

In the damper case 16, a flow path 105 communicating with a third oil chamber S13 (see FIG. 3) of the damping force generator 40 described below is formed at a position facing the oil hole 104.

The piston rod 13 moves relatively in the axial direction of the cylinder 11. The piston rod 13 is fixed to the piston 12 by a nut 19. The piston rod 13 extends along the center axis direction of the inner cylinder 14, penetrates the rod guide 23, and protrudes outside the cylinder 11. Therefore, it can be said that the piston rod 13 is a member connected to the piston 12 and extended to the outside of the cylinder 11. The axle-side mounting member 20 is provided at a lower end 13b of the piston rod 13. On the cylinder 11 side in the axle-side mounting member 20, a bump rubber 22 for preventing the shock absorber 10 from bottoming out is provided so as to cause the piston rod 13 to pass therethrough.

Description of Reservoir 30

Figure 2:
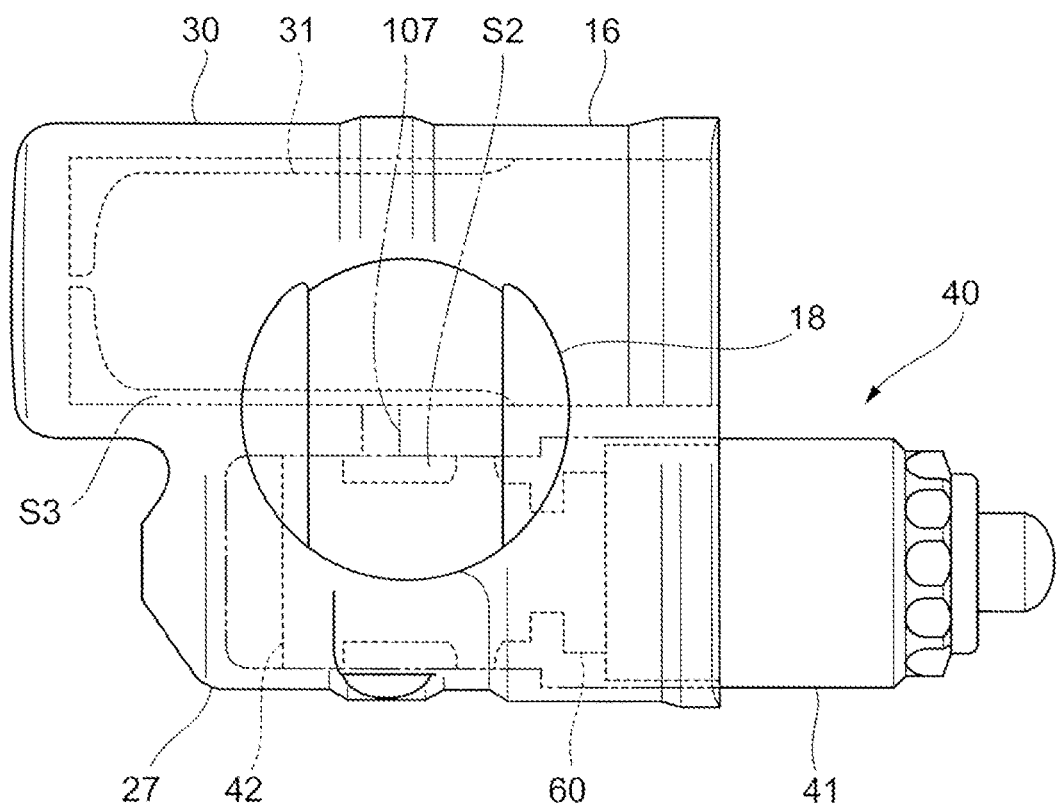
FIG. 2 is a plan view illustrating a damper case provided in the shock absorber.

FIG. 2 is a plan view illustrating the damper case 16 provided in the shock absorber 10.

As illustrated in FIG. 2, the reservoir 30 is formed in the damper case 16 and has, for example, a cylindrical shape. Further, the reservoir 30 has a bag-shaped bladder 31 inside. The bladder 31 is formed in a bag shape by an elastic body such as rubber and is capable of expanding and contracting. The inside of the bladder 31 is filled with a gas such as air. In the reservoir 30, a space outside the bladder 31 is an oil reservoir S3, which communicates with a second oil chamber S12 (see FIG. 3) of the damping force generator 40 to be described below via a communication passage 107. That is, the oil which has passed through the damping force generator 40 can flow through the oil reservoir S3.

Oil is filled in the piston-side oil chamber S1 in the cylinder 11 as described above, the rod-side oil chamber S2, the flow path 101 between the inner cylinder 14 and the outer cylinder 15, the oil reservoir S3 in the reservoir 30, and the damping force generator 40 described below.

Description of Damping Force Generator 40

Figure 3:
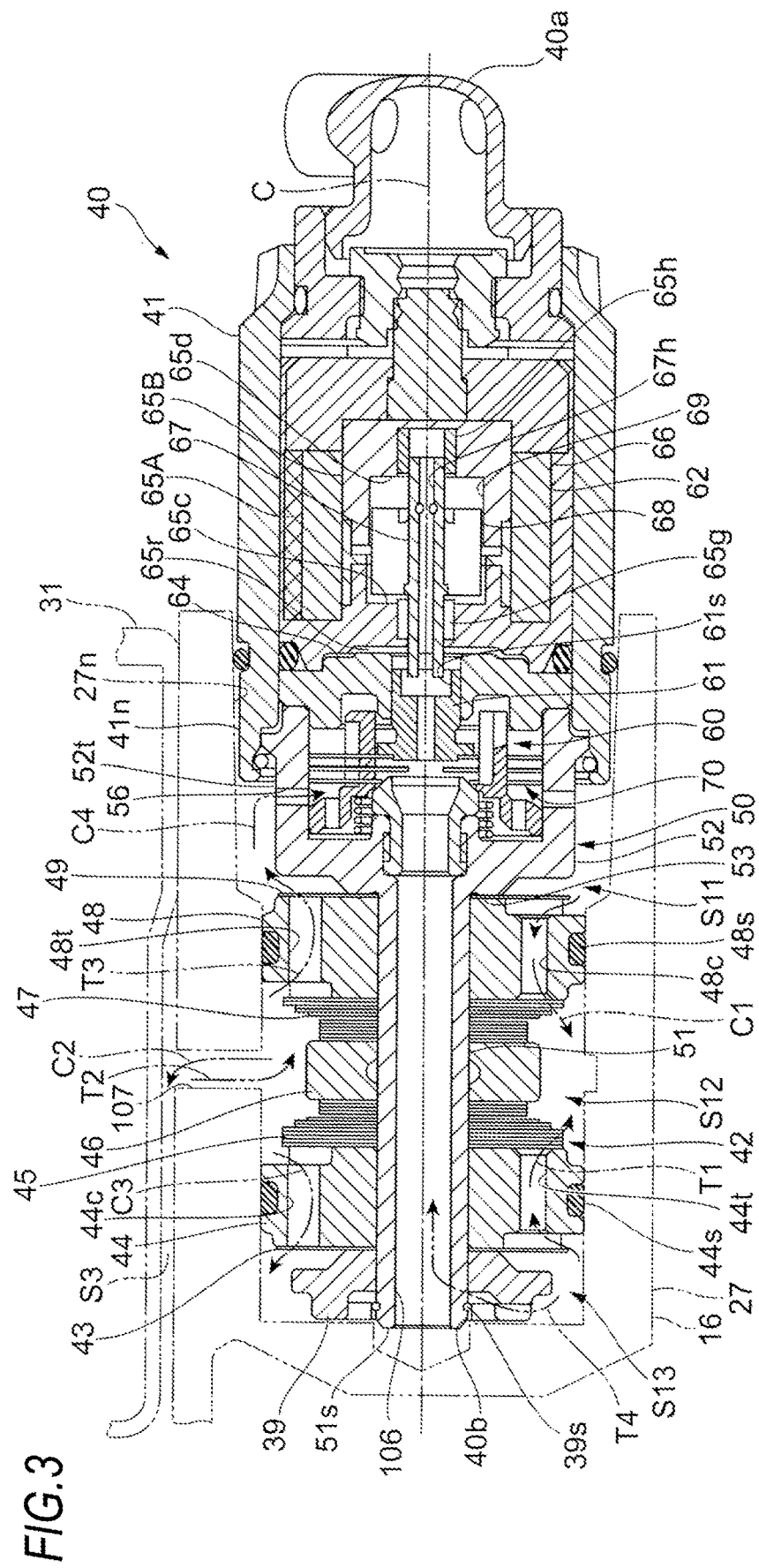
FIG. 3 is a cross-sectional view illustrating a damping force generator provided in the damper case.

FIG. 3 is a cross-sectional view illustrating the damping force generator 40 provided in the damper case 16.

The damping force generator 40 has a flow path through which oil flows with the relative movement of the piston rod 13 and generates a damping force when the oil flows through the flow path. The damping force generator 40 is provided in a bottomed cylindrical damper holding portion 27 formed in the damper case 16. The damping force generator 40 has a columnar shape as a whole and mainly includes a cartridge case 41, a main damper 42, a valve seat member 50, and a control valve portion 60.

The damping force generator 40 is provided with the cylindrical cartridge case 41 on a first end 40a side. On the outer peripheral surface of the cartridge case 41, a male screw portion 41n is formed. The damping force generator 40 is detachably held on the damper holding portion 27 by screwing the male screw portion 41n of the cartridge case 41 into a female screw portion 27n formed on an inner peripheral surface of the damper holding portion 27.

In the following description, in the damping force generator 40, an end on the side where the cartridge case 41 is provided is referred to as the first end 40a and an opposite end is referred to as a second end 40b. Further, a direction connecting the first end 40a and the second end 40b is referred to as a central axis C direction.

The main damper 42 is an example of a damping force generating mechanism and is provided on the second end 40b side of the damping force generator 40 so as to be exposed from the cartridge case 41. In the main damper 42, from the second end 40b side of the damping force generator 40 toward the first end 40a side, a valve stopper 39, a compression-side outlet check valve 43, an extension-side valve seat member 44, an extension-side damping valve 45, an intermediate member 46, a compression-side damping valve 47, a compression-side valve seat member 48, and an extension-side outlet check valve 49 are sequentially arranged. Each of those valve stopper 39, compression-side outlet check valve 43, extension-side valve seat member 44, extension-side damping valve 45, intermediate member 46, compression-side damping valve 47, compression-side valve seat member 48, and extension-side outlet check valve 49 is formed in an annular shape.

The extension-side valve seat member 44 has a plurality of extension-side inlet oil passages 44t and compression-side outlet oil passages 44c alternately formed in the circumferential direction. The extension-side inlet oil passage 44t and the compression-side outlet oil passage 44c are formed by penetrating the extension-side valve seat member 44 in the central axis C direction.

The extension-side inlet oil passage 44t is open on the second end 40b side of the extension-side valve seat member 44. The extension-side damping valve 45 is provided so as to close the outlet on the first end 40a side of the extension-side inlet oil passage 44t. The extension-side damping valve 45 is configured by stacking a plurality of disk valves.

The compression-side outlet oil passage 44c is open on the first end 40a side of the extension-side valve seat member 44. The compression-side outlet check valve 43 is formed of a disk valve and is provided so as to close the outlet on the second end 40b side of the compression-side outlet oil passage 44c.

In the compression-side valve seat member 48, a plurality of compression-side inlet oil passages 48c and extension-side outlet oil passages 48t are alternately formed along the circumferential direction. The compression-side inlet oil passage 48c and the extension-side outlet oil passage 48t are formed to penetrate the compression-side valve seat member 48 in the central axis C direction.

The compression-side inlet oil passage 48c opens on the first end 40a side of the compression-side valve seat member 48. The compression-side damping valve 47 is provided so as to close the outlet on the second end 40b side of the compression-side inlet oil passage 48c. The compression-side damping valve 47 is configured by stacking a plurality of disk valves.

The extension-side outlet oil passage 48t opens to the second end 40b side of the compression-side valve seat member 48. The extension-side outlet check valve 49 is composed of a disk valve and is provided so as to close the outlet on the first end 40a side of the extension-side outlet oil passage 48t.

The extension-side damping valve 45 normally closes the extension-side inlet oil passage 44t to cut off the oil flow and bends and deforms according to the pressure passing through the extension-side inlet oil passage 44t. Then, when the oil passes through a gap with respect to the extension-side inlet oil passage 44t, the extension-side damping valve 45 generates a damping force. In addition, the compression-side damping valve 47 normally closes the pressure-side inlet oil passage 48c to cut off the oil flow and bends and deforms according to the pressure passing through the compression-side inlet oil passage 48c. Then, when the oil passes through the gap with respect to the compression-side inlet oil passage 48c, the compression-side damping valve 47 generates a damping force. The extension-side damping valve 45 adjusts the number of disc valves and the compression-side damping valve 47 adjusts the number of disc valves, thereby adjusting the generated damping force.

The compression-side outlet check valve 43 normally closes the compression-side outlet oil passage 44c to cut off the flow of oil and bends and deforms according to the pressure of the oil passing through the compression-side outlet oil passage 44c to allow the oil to flow. In addition, the extension-side outlet check valve 49 normally closes the extension-side outlet oil passage 48t to cut off the flow of oil and bends and deforms according to the pressure of the oil passing through the extension-side outlet oil passage 48t to allow the oil to flow.

The valve seat member 50 has a small diameter portion 51 and a large diameter portion 52.

The small diameter portion 51 is formed on the second end 40b side of the valve seat member 50. The small diameter portion 51 extends along the central axis C direction of the damping force generator 40. The small diameter portion 51 is inserted into openings formed in central portions of the annular valve stopper 39, compression-side outlet check valve 43, extension-side valve seat member 44, extension-side damping valve 45, intermediate member 46, compression-side damping valve 47, compression-side valve seat member 48, and extension-side outlet check valve 49. The outer diameter of the small diameter portion 51 is substantially the same as the diameter of the openings formed in the central portions of the annular valve stopper 39, compression-side outlet check valve 43, extension-side valve seat member 44, extension-side damping valve 45, intermediate member 46, compression-side damping valve 47, compression-side valve seat member 48, and extension-side outlet check valve 49. The movement of the valve stopper 39 disposed closest to the second end 40b side in a direction where the valve stopper 39 comes off from the small diameter portion 51 toward the second end 40b side is restricted by a stopper ring 39s provided on the outer peripheral surface of the small diameter portion 51.

The large diameter portion 52 has an outer diameter larger than the small diameter portion 51 and is formed continuously with the first end 40a side of the small diameter portion 51. An orthogonal surface 53 orthogonal to the central axis C direction is formed between the large diameter portion 52 and the small diameter section 51. The extension-side outlet check valve 49 abuts on the orthogonal surface 53 and the movement to the large-diameter portion 52 side is restricted.

Figure 4:
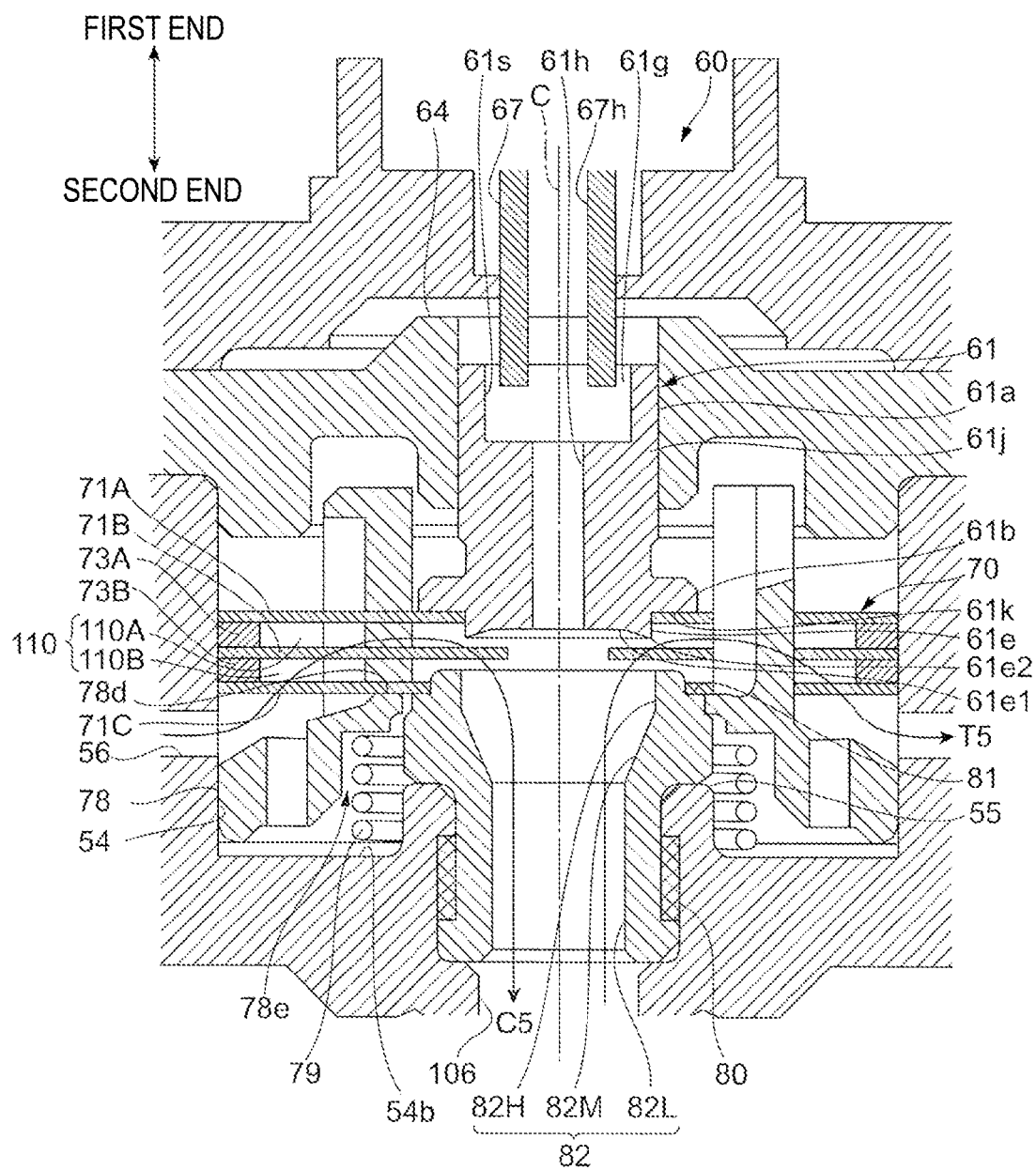
FIG. 4 is an enlarged cross-sectional view illustrating a configuration of a control valve portion of the damping force generator.

FIG. 4 is an enlarged cross-sectional view illustrating the configuration of the control valve portion 60 of the damping force generator 40.

As illustrated in FIGS. 3 and 4, the large diameter portion 52 has a recess portion 54 which is recessed toward the small diameter portion 51 side. At the center of the recess portion 54 of the large diameter portion 52, a boss portion 55 protruding from a bottom surface 54b of the recess portion 54 is formed.

In the large diameter portion 52, a cylindrical portion 52t which further expands toward the outer peripheral side and extends toward the first end 40a (upper part in FIG. 4, see FIG. 3) side is formed on the first end 40a side.

In this large diameter portion 52, a flow passage hole 56 penetrating the inside and outside thereof is formed. The flow passage hole 56 is formed on the outer peripheral side of a valve body 70 of the control valve portion 60 described below.

As illustrated in FIGS. 3 and 4, in the valve seat member 50, a central flow path 106 which allows a tip portion 51s on the second end 40b side of the small diameter portion 51 to communicate with the boss portion 55 of the large diameter portion 52 is formed.

In such a valve seat member 50, parts on the first end 40a sides of the cylindrical portion 52t and the large diameter portion 52 are inserted into the cartridge case 41 and the second end 40b side of the large diameter portion 52 and the main damper 42 held by the small diameter portion 51 protrude outward from the cartridge case 41.

In this way, the main damper 42 protruding from the cartridge case 41 toward the second end 40b side and the large diameter portion 52 of the valve seat member 50 are inserted and arranged inside the bottomed cylindrical damper holding portion 27.

Returning to FIG. 3, the extension-side valve seat member 44 and the compression-side valve seat member 48 of the main damper 42 are provided with annular seal rings 44s and 48s on their outer peripheral surfaces, respectively. In a state where the main damper 42 is accommodated in the damper holding portion 27, the respective seal rings 44s and 48s abut against the inner peripheral surface of the damper holding portion 27, thereby a first oil chamber S11, a second oil chamber S12, and a third oil chamber S13 are formed between the damper holding portion 27 and the main damper 42.

The first oil chamber S11 is formed closer to the first end 40a side than the seal ring 48s of the compression-side valve seat member 48. The second oil chamber S12 is formed between the seal ring 44s of the extension-side valve seat member 44 and the seal ring 48s of the compression-side valve seat member 48. The third oil chamber S13 is formed between the bottom on the second end 40b side of the damper case 16 and the seal ring 44s of the extension-side valve seat member 44.

The tip portion 51s of the small diameter portion 51 of the valve seat member 50 is disposed in the third oil chamber S13 of the damper case 16 and the third oil chamber S13 communicates with the central flow path 106 formed in the small diameter portion 51.

Also, in damper case 16, at a position facing the second oil chamber S12 between the compression-side valve seat member 48 and the extension-side valve seat member 44, the communication passage 107 communicating with the oil reservoir S3 in the reservoir 30 is formed.

The control valve portion 60 is an example of a valve mechanism. The control valve portion 60 includes a drive valve 61, a solenoid actuator 62 for driving the drive valve 61, an annular valve body holder 64 fitted inside the cylindrical portion 52t, a valve body 70 accommodated in the recess portion 54, and an orifice collar 80 arranged to be able to be in contact with the valve body 70. Still further, the control valve portion 60 includes a valve collar 78 and a coil spring 79 disposed between the valve collar 78 and the orifice collar 80.

The drive valve 61 is provided on the valve body holder 64 so as to be movable along the central axis C direction of the damping force generator 40. The drive valve 61 is disposed on an opposite side (the drive valve 61 is located on the upper side of the valve body 70 and the orifice collar 80 is located on the lower side of the valve body 70) of the orifice collar 80 with respect to the valve body 70.

As illustrated in FIG. 4, the drive valve 61 includes a shaft portion 61*j* having therein a flow path 61*h* formed in the central axis C direction and a step portion 61*b* extending from an outer peripheral surface 61*a* of the shaft portion 61*j* to a radial outside of the shaft portion 61*j*. The flow path 61*h* is a through-hole penetrating in the central axis C direction and the shaft portion 61*j* has a substantially cylindrical shape as a whole by the outer peripheral surface 61*a* and the flow path 61*h*. The outer peripheral surface 61*a* is the outer surface of the cylinder and the flow path 61*h* is the inner peripheral surface or the inner surface of the cylinder. The shaft portion 61*j* has a rod accommodation portion 61*s* which is recessed toward the front end portion side at the rear end portion on the first end 40*a* side.

The step portion 61*b* is an annular portion which protrudes from the outer peripheral surface 61*a* in a direction substantially perpendicular to the central axis C direction and continues to the outer peripheral surface 61*a*. Then, the drive valve 61 forms an accommodation portion 61*k* by the step portion 61*b*. In the embodiment, a spoke valve 71A, which is an example of a valve body, which is a part of the valve body 70 disposed closest to the drive valve 61 side, is accommodated in the accommodation portion 61*k* and the step portion 61*b* and the spoke valve 71A are in contact with each other. The direction in which the step portion 61*b* protrudes from the outer peripheral surface 61*a* is also a direction along the direction in which oil flows. That is, the step portion 61*b* protrudes in a direction substantially perpendicular to the central axis C direction, thereby accommodating a part of the valve body 70 without a gap and making it difficult to obstruct the flow of oil. When the drive valve 61 presses the valve body 70, the step portion 61*b* presses the spoke valve 71A and the spoke valve 71A is elastically deformed toward the orifice collar 80 side.

Further, the shaft portion 61*j* has a tip portion 61*e* at the end on the second end 40*b* side. The tip portion 61*e* extends further on the second end 40*b* side (orifice collar 80 side) than the step portion 61*b*. The tip portion 61*e* is formed in an annular shape around the central axis C and the outer diameter of the tip portion 61*e* is smaller than the outer diameter of the step portion 61*b*. Further, the tip portion 61*e* has an annular recess portion 61*e*1 on the end surface on the second end 40*b* side (orifice collar 80 side).

Figure 5:
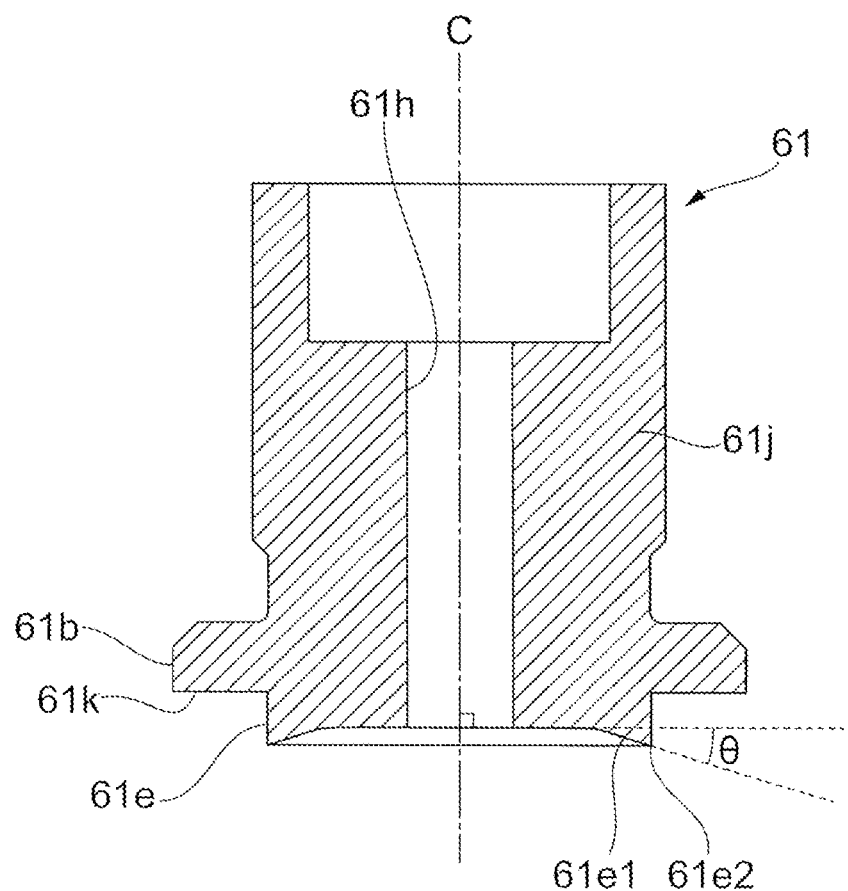
FIG. 5 is a diagram illustrating a tip portion of the drive valve in detail.

FIG. 5 is a diagram illustrating the tip portion 61*e* of the drive valve 61 in detail.

As illustrated in FIG. 5, an angle θ formed by a plane having the central axis C as a normal direction and an inclined surface on a top portion 61*e*2 side of the recess portion 61*e*1 facing the orifice collar 80 is preferably 10° or more and 30° or less (10°≤θ≤30°), and particularly preferably 20°. As a result, a vortex is less likely to be generated, and thus the oil flow in the compression stroke becomes smoother.

Further, the tip portion 61*e* faces the spoke valve 71B disposed further on the second end 40*b* side (orifice collar 80 side) than the spoke valve 71A of the valve body 70 described below in detail. The tip portion 61*e* is not in contact with the spoke valve 71B when the drive valve 61 does not press the valve body 70. When the drive valve 61 presses the valve body 70, the tip portion 61*e* comes into contact with the spoke valve 71B and the tip portion 61*e* presses the spoke valve 71B. As a result, the spoke valve 71B elastically deforms toward the second end 40*b* side (orifice collar 80 side). In this case, since the recess portion 61*e*1 is formed in the tip portion 61*e*, the top portion 61*e*2 of the tip portion 61*e* is in contact with the spoke valve 71B.

The solenoid actuator 62 moves the drive valve 61 in the central axis C direction of the valve body 70. The solenoid actuator 62 is provided in the cartridge case 41 as illustrated in FIG. 3. In addition, the solenoid actuator 62 includes two cores 65A and 65B, a coil 66, a rod 67, and a plunger 68.

The core 65A is a bottomed cylinder having a recess portion 65*c* and the core 65B is a bottomed cylinder having a recess portion 65*d*. The two cores 65A and 65B are provided with the recess portions 65*c* and 65*d* facing each other, so that a plunger chamber 69 which is continuous in the central axis C direction is formed.

The coil 66 has a cylindrical shape and is arranged on the outer peripheral side of the plunger chamber 69.

The rod 67 extends along the central axis C direction. The rod 67 is slidably held along a central axis C direction by a guide bush 65*g* provided on one core 65A and a guide bush 65*h* provided in a recess portion formed on the other core 65B.

The rod 67 has a through-hole 67*h* penetrating in the central axis C direction.

The tip of the rod 67 on the second end 40*b* side is inserted into the rod accommodation portion 61*s* provided in the drive valve 61. The outer diameter of the rod 67 is smaller than the inner diameter of the rod accommodation portion 61*s*, so that a cylindrical gap 61*g* is formed in the rod accommodation portion 61*s* with respect to the rod 67. The rod 67 has a communication hole (not illustrated) at the tip end on the second end 40*b* side for communicating the inside of the through-hole 67*h* with the gap 61*g*.

Further, a back pressure chamber 65*r* which expands on the outer peripheral side of the rod 67 is formed between the core 65A and the valve body holder 64. The back pressure chamber 65*r* communicates with the gap 61*g* and further communicates with the inside of the through-hole 67*h* of the rod 67 through a communication hole (not illustrated).

Such a solenoid actuator 62 adjusts the electromagnetic force generated in the coil 66 by increasing or decreasing the current applied to the coil 66, so that the rod 67 moves back and forth in the central axis C direction. The advance and retreat of the rod 67 allows the position of the drive valve 61 to be adjusted in the central axis C direction. That is, when a current is applied to the coil 66, the solenoid actuator 62 generates a thrust for pushing the drive valve 61 toward the second end 40*b*. The drive valve 61 presses the valve body 70 toward the second end 40*b* by the thrust and the pressure of the oil flowing into the back pressure chamber 65*r*.

Figure 6:
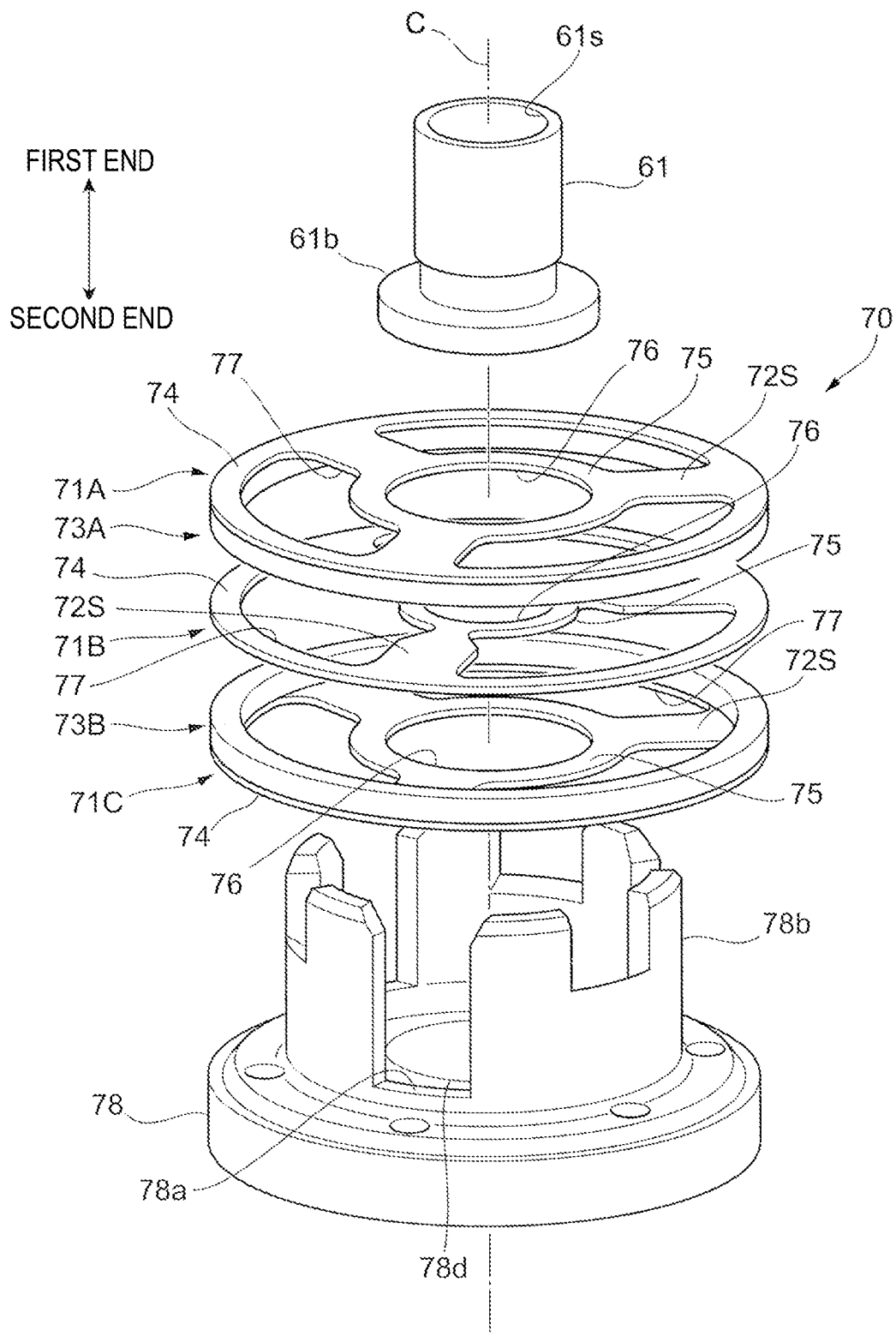
FIG. 6 is a diagram illustrating a configuration of a valve body.

FIG. 6 is a diagram illustrating a configuration of the valve body 70.

FIG. 6 also illustrates the drive valve 61 and the valve collar 78 in addition to the valve body 70.

The illustrated valve body 70 is a member having a cylindrical shape as a whole. The valve body 70 is arranged such that the center thereof substantially coincides with the central axis C. The valve body 70 has the spoke valve 71A, a spacer 73A, the spoke valve 71B, a spacer 73B, and a spoke valve 71C which are sequentially stacked from the first end 40*a* to the second end 40*b*. In other words, it can be said that the spoke valve 71A, the spoke valve 71B, and the spoke valve 71C are stacked in a direction in which the solenoid actuator 62 presses the drive valve 61. In the embodiment, the valve body 70 includes a plurality of valve bodies (three spoke valves 71A, 71B, and 71C) stacked in the axial direction and spacers (spacers 73A and 73B disposed between spoke valves adjacent in the stacking direction) disposed between valve bodies adjacent in the stacking direction; Here, a case is shown in which three spoke valves are stacked in the axial direction, but the invention can also be configured to include four or more spoke valves stacked in the axial direction.

The spoke valve 71A is an example of a second valve body and is located at the upper end on the first end 40*a* side of the plurality of valve bodies. The spoke valve 71A includes an outer frame portion 74 formed in an annular shape, an annular inner frame portion 75 arranged radially inside the outer frame portion 74, and a plurality of spoke portions 72S connecting the outer frame portion 74 and the inner frame portion 75. Thus, a center hole 76 is formed inside the inner frame portion 75. Further, a plurality of spoke portions 72S are arranged apart from each other, and in the embodiment, three spoke portions 72S are arranged at equal intervals in the circumferential direction. That is, one spoke portion 72S is arranged every 120° in the circumferential direction. As a result, three opening portions 77 are formed between the spokes 72S adjacent to each other in the circumferential direction. The center hole 76 and the opening portion 77 are examples of a through hole provided in the valve body 70 and penetrating in the axial direction of the cylindrical body.

The spoke valve 71B is an example of a valve body arranged further on the second end 40*b* side (orifice collar 80 side) than the spoke valve 71A. The spoke valve 71C is located at the lower end on the second end 40*b* side. The spoke valve 71C is an example of a first valve body arranged so as to be in contact with the central axis C direction end surface of the orifice collar 80 which is a cylindrical body.

As illustrated in the drawings, the outer frame portions 74 and the spoke portions 72S of the spoke valve 71B and the spoke valve 71C have the same configuration as the outer frame portion 74 and the spoke portions 72S of the spoke valve 71A.

However, the inner frame portion 75 of the spoke valve 71B is formed further on the radial inner side than the inner frame portion 75 of the spoke valve 71A. That is, the inner frame portion 75 of the spoke valve 71B is smaller in size than the inner frame portion 75 of the spoke valve 71A. As a result, the center hole 76 of the spoke valve 71B is smaller than the center hole 76 of the spoke valve 71A.

Further, the inner frame portion 75 of the spoke valve 71C is formed further on the radial outer side than the inner frame portion 75 of the spoke valve 71A. That is, the inner frame portion 75 of the spoke valve 71C is larger in size than the inner frame portion 75 of the spoke valve 71A. As a result, the center hole 76 of the spoke valve 71C is larger than the center hole 76 of the spoke valve 71A.

That is, the size of the center hole 76 decreases in the order of the spoke valve 71C, the spoke valve 71A, and the spoke valve 71B.

The spoke valve 71A and the spoke valve 71C are formed by stacking a plurality of plate members having the same shape. In the embodiment, each of the spoke valve 71A and the spoke valve 71C is formed by stacking three plate-shaped members.

On the other hand, the spoke valve 71B is not formed of such a laminate, but is formed of a single plate-shaped member.

As illustrated in FIGS. 4 and 6, the inner frame portion 75 of the spoke valve 71A has the upper surface, which is the surface on the first end 40*a* side, accommodated in the accommodation portion 61*k* of the drive valve 61. That is, the diameter of the center hole 76 of the spoke valve 71A is substantially equal to the outer diameter of the accommodation portion 61*k* and the inner peripheral surface of the center hole 76 is in contact with the accommodation portion 61*k*.

In the inner frame portion 75 of the spoke valve 71B, the upper surface, which is the surface on the first end 40*a* side, faces the tip portion 61*e* of the drive valve 61.

Further, the inner frame portion 75 of the spoke valve 71C is placed on an orifice collar 80 described below and the valve collar 78.

The opening portion 77 of each of the spoke valve 71A, the spoke valve 71B, and the spoke valve 71C functions as a part of a flow path through which oil flows. The opening portion 77 can be said to be a central axis C direction flow path of the valve body 70.

The axial gap between the spoke valve 71A and the spoke valve 71B functions as a gap flow path 110A through which oil flows. Similarly, the axial gap between the spoke valve 71B and the spoke valve 71C also functions as a gap flow path 110B through which oil flows. The gap flow path 110A and the gap flow path 110B are a part of the flow path formed in the valve body 70 and can be said to be radial flow paths in the valve body 70. Hereinafter, when there is no need to distinguish between the gap flow path 110A and the gap flow path 110B, the gap flow path 110A and the gap flow path 110B may be simply referred to as the "gap flow path 110".

The spacer 73A has an annular shape, is disposed between the spoke valve 71A and the spoke valve 71B, and adjusts the gap between the spoke valve 71A and the spoke valve 71B. Thereby, the flow path area of the gap flow path 110A between the spoke valve 71A and the spoke valve 71B is adjusted.

The spacer 73B also has an annular shape and is disposed between the spoke valve 71B and the spoke valve 71C, and adjusts the gap between the spoke valve 71B and the spoke valve 71C. Thereby, the flow path area of the gap flow path 110B between the spoke valve 71B and the spoke valve 71C is adjusted.

The spacer 73A and the spacer 73B are disposed so as to be located between outer frame portions 74 of the spoke valves 71A, 71B, and 71C adjacent to each other in the stacking direction. That is, the spacer 73A and the spacer 73B have the same shape and size as the outer frame portions 74 of the spoke valves 71A, 71B, and 71C and are interposed between the outer frame portions 74 adjacent in the stacking direction, thereby the distance between the spoke valve 71A and the spoke valve 71B and the distance between the spoke valve 71B and the spoke valve 71C are adjusted.

The valve collar 78 is a positioning member for the spoke valves 71A, 71B, and 71C of the valve body 70. The valve collar 78 includes a first recess portion 78*a* disposed at a position corresponding to the spoke portions 72S of the spoke valves 71A, 71B, and 71C in the circumferential direction. As described above, in the embodiment, since three spoke portions 72S are arranged at equal intervals in the circumferential direction, three first recess portions 78*a* are provided at equal intervals in the circumferential direction. Further, the valve collar 78 includes a convex portion 78*b* protruding with respect to the first recess portion 78*a* between the first recess portions 78*a* adjacent in the circumferential direction. Three convex portions 78*b* provided at equal intervals in the circumferential direction penetrate the opening portions 77 of the spoke valves 71A, 71B, and 71C. Thus, the spoke valves 71A, 71B, and 71C can be positioned in the circumferential direction.

The valve collar 78 has a mounting portion 78d. The inner frame portion 75 of the spoke valve 71C is mounted on the mounting portion 78d. Thus, the spoke valves 71A, 71B, and 71C can be positioned in the central axis C direction.

The coil spring 79 is provided in a compressed state on a recess portion 78e provided on the second end 40b side of the valve collar 78. When the drive valve 61 presses the valve body 70, the coil spring 79 is pressed through the valve body 70 and the valve collar 78, so that the compressed state is maintained.

The orifice collar 80 is an example of a cylindrical body and is disposed opposite the drive valve 61 with the valve body 70 interposed therebetween.

In the orifice collar 80, an upper end portion 81 which comes in contact with the valve body 70 and accommodates the valve body 70 is provided in the end surface on the first end 40a side in the central axis C direction. The valve body 70 is accommodated in the orifice collar 80 in a state where the end surface on the first end 40a side in the center axis direction of the upper end portion 81 and the end surface on the orifice collar 80 side of the inner frame portion 75 of the spoke valve 71C are in contact with each other.

Further, the orifice collar 80 has a through-hole 82 as a hollow portion penetrating in the axial direction. The through-hole 82 allows oil to flow in the central axis C direction (axial direction) inside the orifice collar 80. The through-hole 82 has an upper through-hole 82H located at the upper part on the first end 40a side, a lower through-hole 82L located at the lower part on the second end 40b side, and a middle through-hole 82M connecting the upper through-hole 82H and the lower through-hole 82L. Among those, the flow paths of the upper through-hole 82H and the lower through-hole 82L have constant diameters in the central axis C direction (axial direction). On the other hand, the shape of the middle through-hole 82M is an orifice shape in which the diameter decreases as it goes away from the valve body 70 with respect to the central axis C direction (axial direction). In other words, the middle through-hole 82M can be said to be an orifice portion of which the inner diameter increases as it approaches the valve body 70. Further, by setting the diameter of the end portion on the first end 40a side of the middle through-hole 82M to be the same as the diameter of the upper through-hole 82H and the diameter of the end portion on the second end 40b side of the middle through-hole 82M to be the same as the diameter of the lower through-hole 82L, the upper through-hole 82H, the middle through-hole 82M, and the lower through-hole 82L are continuously connected.

When the middle through-hole 82M of the through-hole 82 is not made into an orifice shape, the distance between the end on the second end 40b side of the drive valve 61 and the inner peripheral surface of the through-hole 82 is reduced. As a result, the flow of oil is easily hindered. However, in the embodiment, since the middle through-hole 82M as the orifice portion is provided, the oil can be more smoothly circulated.

As will be described below in detail, when the diameter of the opening portion of the upper through-hole 82H is changed, the pressure receiving area in the compression stroke changes. Therefore, the orifice collar 80 having a different diameter of the opening portion of the upper through-hole 82H can be easily used by forming the orifice collar 80 as a separate member without being integrated with the valve seat member 50, and thus the damping characteristics can be easily changed. The orifice collar 80 can be easily exchanged by screwing it into the valve seat member 50 in a screwing manner, for example.

Description of Operation of Damping Force Generator 40

Next, the operation of the damping force generator 40 will be described.

Compression Stroke

In the compression stroke in which the piston 12 moves toward the vehicle body side in the cylinder 11, the oil in the piston-side oil chamber S1 is compressed by the piston 12. Then, the oil in the piston-side oil chamber S1 is sent from the oil hole 102 formed in the damper case 16 to the first oil chamber S11 formed in the damper holding portion 27. As illustrated by an arrow C1 in FIG. 3, the oil sent into the first oil chamber S11 passes through the compression-side inlet oil passage 48c formed in the compression-side valve seat member 48 of the main damper 42, pushes open the compression-side damping valve 47 provided on the outlet side, and flows into the second oil chamber S12. In this case, the compression-side damping valve 47 is pushed open and the oil passes through a gap formed between the outlet of the compression-side inlet oil passage 48c and the compression-side damping valve 47, thereby generating a damping force.

Part of the oil which has flowed into the second oil chamber S12 flows through the communication passage 107 formed in the damper case 16 and flows into the oil reservoir S3, as indicated by an arrow C2 in FIG. 3. Also, as indicated by an arrow C3 in FIG. 3, the remainder of the oil which has flowed into the second oil chamber S12 flows into the compression-side outlet oil passage 44c of the extension-side valve seat member 44 and pushes open the compression-side outlet check valve 43 to flow into the third oil chamber S13.

The oil flowing into the third oil chamber S13 passes through the flow path 105 formed in the damper case 16 and flows from the oil hole 104 formed at the upper end of the outer cylinder 15 to the cylindrical flow path 101 formed between the inner cylinder 14 and the outer cylinder 15. The oil flowing into the flow path 101 passes through the oil hole 103 and flows into the rod-side oil chamber S2. In this way, the oil flows into the rod-side oil chamber S2, in such a manner that, when the piston rod 13 enters the cylinder 11, the oil amount corresponding to the entry volume of the piston rod 13 is compensated.

As indicated by an arrow C4 in FIG. 3, the oil in the first oil chamber S11 flows from the flow passage hole 56 formed in the large diameter portion 52 of the valve seat member 50 into the large diameter portion 52 of the valve seat member 50.

As indicated by an arrow C5 in FIG. 4, the oil which has flowed into the large diameter portion 52 passes through the opening portions 77 formed in the spoke valve 71B and the spoke valve 71C, the gap flow path 110, and the opening portions 77 formed in the spoke valve 71B and the spoke valve 71C and flows into the through-hole 82 of the orifice collar 80. Then, the oil which has flowed into the through hole 82 flows through the central flow path 106 formed in the valve seat member 50 and flows into the third oil chamber S13.

In this case, a damping force is generated by the resistance generated when the oil flowing along the path indicated by the arrow C5 passes through the gap flow path 110.

Extension Stroke

In the extension stroke in which the piston 12 moves toward a wheel inside the cylinder 11 due to the vertical movement of the wheel, the oil in the rod-side oil chamber S2 is compressed by the piston 12. Then, the oil in the rod-side oil chamber S2 flows through the oil hole 103 formed at the lower end of the inner cylinder 14 and flows into the cylindrical flow path 101 formed between the inner cylinder 14 and the outer cylinder 15. The oil flowing through the flow path 101 is sent from the oil hole 104 formed at the upper end of the outer cylinder 15 through the flow path 105 formed in the damper case 16 to the third oil chamber S13 of the damping force generator 40.

As indicated by an arrow T1 in FIG. 3, the oil sent to the third oil chamber S13 flows into the extension-side inlet oil passage 44t of the extension-side valve seat member 44 and generates a damping force by pushing open the extension-side damping valve 45 provided on the outlet side.

The oil which has passed through the gap formed between the extension-side inlet oil passage 44t and the extension-side damping valve 45 flows into the second oil chamber S12. Also, as indicated by an arrow T2 in FIG. 3, in order to compensate for the volume change of the piston rod 13 in the cylinder 11 due to the movement of the piston 12, oil flows from the oil reservoir S3 into the second oil chamber S12 through the communication passage 107 formed in the damper case 16.

As indicated by an arrow T3 in FIG. 3, the oil which has flowed into the second oil chamber S12 passes through the extension-side outlet oil passage 48t of the compression-side valve seat member 48, pushes open the extension-side outlet check valve 49, and flows into the first oil chamber S11.

The oil which has flowed into the first oil chamber S11 flows from the oil hole 102 formed in the damper case 16 into the piston-side oil chamber S1. In this way, the oil flows into the piston-side oil chamber S1, in such a manner that, when the piston rod 13 exits from the cylinder 11, the oil amount corresponding to the exit volume of the piston rod 13 is compensated.

As indicated by an arrow T4 in FIG. 3, the oil which has flowed into the third oil chamber S13 flows into the central flow path 106 from the tip of the small diameter portion 51 of the valve seat member 50 and flows to the through-hole 82 of the orifice collar 80 in the control valve portion 60.

As indicated by an arrow T5 in FIG. 4, the oil which has flowed into the through-hole 82 in this way passes from the through-hole 82 of the orifice collar 80 through the center holes 76 formed in the spoke valve 71A and the spoke valve 71B. Then, the oil passing through the center hole 76 passes through the gap flow path 110 and the opening portions 77 formed in the spoke valve 71B and the spoke valve 71C and flows into the first oil chamber S11 via the flow passage hole 56 formed in the large diameter portion 52 of the valve seat member 50.

In this case, a damping force is generated by the resistance generated when the oil flowing in the path indicated by the arrow T5 passes through the gap flow path 110.

Figure 7A:
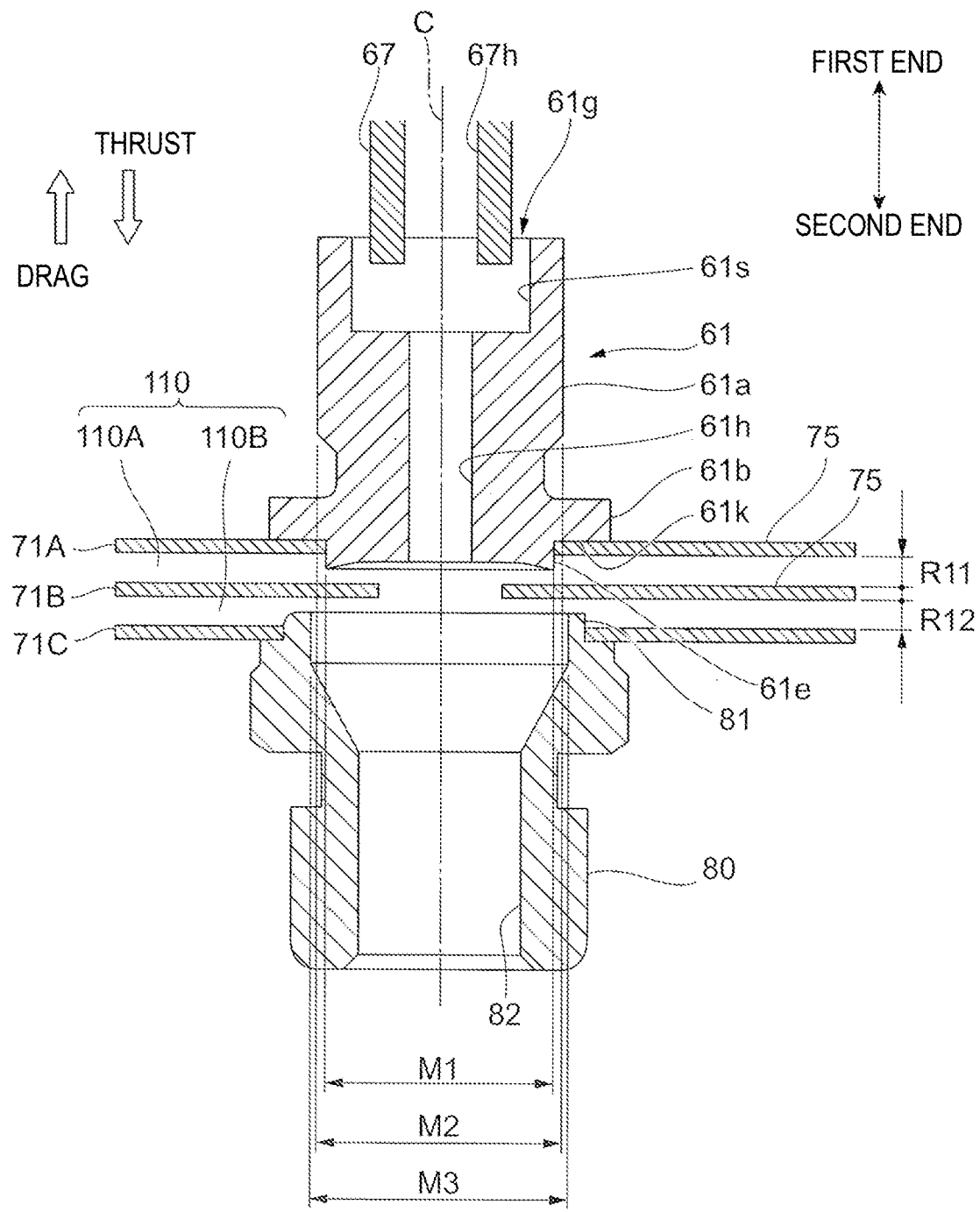
FIG. 7A is a view illustrating a state before the drive valve is displaced toward a valve body side.
Figure 7B:
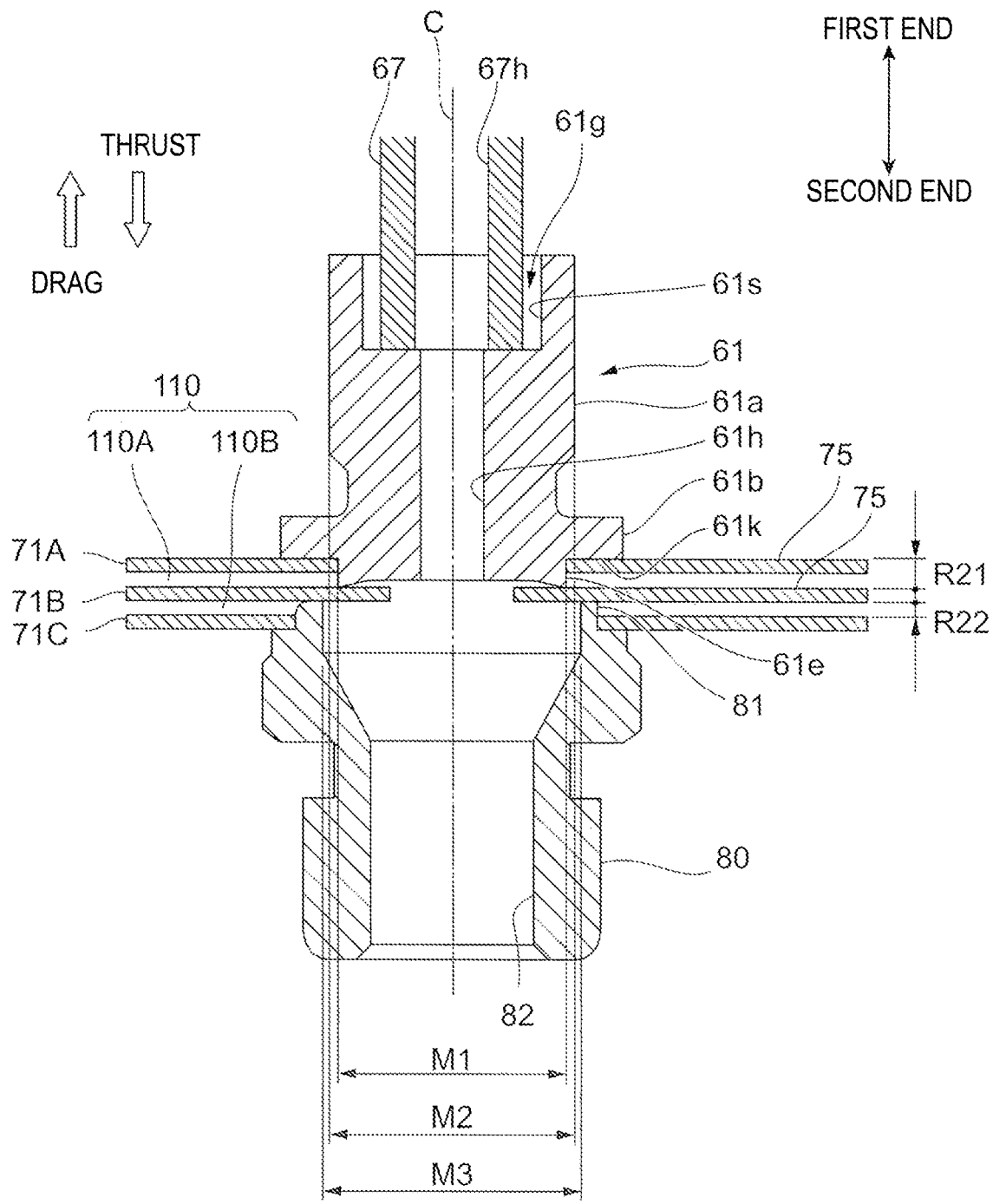
FIG. 7B is a view illustrating a state after the drive valve is displaced toward the valve body side.

FIGS. 7A and 7B are cross-sectional views comparing before and after the drive valve 61 is displaced toward the valve body 70 side by the thrust of the solenoid actuator 62. FIG. 7A illustrates a state before the drive valve 61 is displaced to the valve body 70 side and FIG. 7B illustrates a state after the drive valve 61 is displaced to the valve body 70 side.

In the state illustrated in FIG. 7A, no thrust of the solenoid actuator 62 is generated. Therefore, the drive valve 61 does not press the valve body 70. Since the valve body 70 is not pressed by the drive valve 61, none of the spoke valve 71A, the spoke valve 71B, and the spoke valve 71C of the valve body 70 are deformed. In a state where the thrust of the solenoid actuator 62 is not generated, a width R11 of the gap flow path 110A between the spoke valve 71A and the spoke valve 71B and a width R12 of the gap flow path 110B between the spoke valve 71B and the spoke valve 71C are substantially the same in the radial direction of each spoke valve. The width R11 and the width R12 are the thickness of the spacer 73A and the spacer 73B, respectively.

On the other hand, in the state illustrated in FIG. 7B, thrust of the solenoid actuator 62 is generated. When the thrust of the solenoid actuator 62 is generated, the rod 67 moves in the direction of pressing the valve body 70, and thus the moved rod 67 and the drive valve 61 come into contact with each other. In this way, after the rod 67 comes into contact with the drive valve 61, the thrust rod 67 moves further in the direction of pressing the valve body 70. As a result, the drive valve 61 also moves in the direction of pressing the valve body 70 and the drive valve 61 presses the valve body 70. In this case, the step portion 61b of the drive valve 61 presses the inner frame portion 75 of the spoke valve 71A, and then the tip portion 61e of the drive valve 61 presses the inner frame portion 75 of the spoke valve 71B. As a result, the respective spoke portions 72S of the spoke valve 71A and the spoke valve 71B are mainly elastically deformed and the inner frame portions 75 of the spoke valve 71A and the spoke valve 71B move toward the second end 40b side. That is, in this case, it moves downward in the drawings.

Even when the thrust of the solenoid actuator 62 is generated, the outer frame portions 74 of the spoke valve 71A and the spoke valve 71B is hardly deformed. Since there is the spacer 73A between the outer frame portion 74 of the spoke valve 71A and the outer frame portion 74 of the spoke valve 71B, the gap between the spoke valve 71A and the spoke valve 71B does not change. On the other hand, the inner frame portion 75 of the spoke valve 71A is pressed and elastically deformed, and moves to the second end 40b side. The inner frame portion 75 of the spoke valve 71B moves toward the second end 40b side by being pressed and elastically deformed after the tip portion 61e comes in contact with the spoke valve 71B. That is, the inner frame portion 75 of the spoke valve 71B moves later than the inner frame portion 75 of the spoke valve 71A. As a result, the gap of the gap flow path 110A between the spoke valve 71A and the spoke valve 71B becomes smaller than the R11 and becomes an R21 illustrated in FIG. 7B. That is, the inner frame portions 75 of the spoke valve 71A and the spoke valve 71B are pressed and elastically deformed, so that the flow path area of the gap flow path 110A is reduced. That is, by elastically deforming the inner peripheral portion of the valve body 70 which comes into contact with the drive valve 61 moved in the direction approaching the valve body 70 in the direction approaching the orifice collar 80 with respect to the outer peripheral portion of the valve body 70, the gap between the plurality of valve bodies 70 can be changed.

Also, the inner frame portion 75 of the spoke valve 71C does not move because it is not pressed, but the inner frame portion 75 of the spoke valve 71B moves by being elastically deformed by being pressed. Therefore, the gap of the gap flow path 110B between the inner frame portion 75 of the spoke valve 71B and the inner frame portion 75 of the spoke valve 71C becomes smaller than the R12 and becomes an R22 illustrated in FIG. 7B. That is, the inner frame portions 75 of the spoke valve 71A and the spoke valve 71B is pressed and elastically deformed, so that the flow path area of the gap flow path 110B is reduced.

The damping force generated when the oil passes through the gap flow path 110 is a force directed to move the drive valve 61 to the valve opening side. That is, when the oil passes through the gap flow path 110, the solenoid actuator 62 generates a drag against the force displacing the drive valve 61 toward the valve body 70 side.

In the compression stroke, this drag is a force in the direction to separate the tip portion 61e from the spoke valve 71B and the pressure receiving area which is the area where the drag is exerted is the area of the circle at the top portion 61e2 of the tip portion 61e. That is, it is the area of the circle having a diameter M1 illustrated in FIG. 7A. In addition, in the extension stroke, the above-described drag is a force in a direction in which the spoke valve 71B is separated from the orifice collar 80 and the pressure receiving area which is the area where the drag is exerted is the area of the circle of the opening portion of the upper through-hole 82H of the orifice collar 80. That is, it is the area of the circle having a diameter M3 illustrated in FIG. 7A.

As described above, the drive valve 61 is formed with the flow path 61h communicating with the central axis C direction. Further, the communication hole for communicating the inside of the through-hole 67h with the gap 61g of the drive valve 61 is formed at the tip of the rod 67, and a back pressure chamber 65r is further formed ahead thereof. Therefore, the oil can flow around behind the drive valve 61, thereby generating a force (back pressure) in a direction to cancel the drag. Here, the second end 40b side of the drive valve 61 communicates with the back pressure chamber 65r via the flow path 61h. Therefore, it is considered that the pressure on the second end 40b side of the drive valve 61 which exerts the drag and the back pressure on the back pressure chamber 65r side are almost the same. The pressure receiving area, which is the area exerting the back pressure, is the area of the circle at the outer peripheral surface 61a. This is the area of the circle of diameter M2 illustrated in FIG. 7A.

Therefore, in the compression stroke, the annular area, which is the difference between the area of the circle of the diameter M1 and the area of the circle of the diameter M2, is the substantial pressure receiving area of the drag, and in the extension stroke, the annular area, which is the difference between the area of the circle having the diameter M2 and the area of the circle having the diameter M3, is a substantial pressure receiving area of the drag. In the embodiment, the contact area between tip portion 61e and valve body 70 is reduced by providing the top portion 61e2 in the tip portion 61e. Thus, by reducing the contact area between the tip portion 61e and the valve body 70, the pressure receiving diameter at the time of valve opening can be controlled with higher accuracy. As a result, the damping force can be controlled with higher accuracy.

When the above-described drag is greater than the force for displacing the drive valve 61 toward the valve body 70 side by the solenoid actuator 62, the drive valve 61 moves to the valve opening side. As a result, in the compression stroke, the tip portion 61e and the spoke valve 71B are separated to form the first gap, and in the extension stroke, the spoke valve 71B and the orifice collar 80 are separated to form the second gap. By forming the first gap and the second gap in this manner, the flow path area can be increased in each of the compression stroke and the extension stroke. In addition, by reducing the drag after increasing the flow path area, the tip portion 61e can be brought into contact with the spoke valve 71B in the compression stroke and the spoke valve 71B can be brought into contact with the orifice collar 80 in the extension stroke. In this way, according to the invention, the increased flow path area can be reduced. That is, according to the invention, the flow path area can be increased or decreased by the damping pressure.

In the embodiment, the oil flowing due to sliding of the piston 12 flows through the control valve portion 60 to generate a damping force. The drag becomes larger when the oil flows through the gap flow path 110 at a high speed, and when the wheels are rapidly displaced in the up-down direction due to the unevenness of the road surface, for example, and the piston 12 is displaced at a high speed in the cylinder 11. In such a case, since the drag increases, the first gap and the second gap tend to further increase. By making the first gap and the second gap larger, more oil can be circulated through the first gap and the second gap.

The damping force can be adjusted by the thrust of the solenoid actuator 62 pressing the drive valve 61. In other words, the smaller the thrust of the solenoid actuator 62 pressing the drive valve 61, the greater the drag is likely to be greater than the thrust, so the first gap and the second gap are likely to be large and the damping force becomes small. On the other hand, the greater the thrust of the solenoid actuator 62 pressing the drive valve 61, the more difficult it is for the drag to be greater than the thrust, so the first gap and the second gap are likely to be small and the damping force becomes large.

In the control valve portion 60, the valve body 70 is positioned with high accuracy by the valve collar 78. Further, the positions between the spoke valves 71A, 71B, and 71C and the spacers 73A and 73B forming the valve body 70 are also positioned with high accuracy. Therefore, the flow path area of the gap flow path 110 can be determined with high accuracy, and thus the damping force generated in the gap flow path 110 can be adjusted with higher accuracy.

Also, the oil flow path is different between the compression stroke and the extension stroke. Therefore, for example, by changing the thickness of the spacer 73A and the spacer 73B, it is possible to independently adjust the damping force in each of the compression stroke and the extension stroke.

Further, the spoke valves 71A, 71B, and 71C and the spacers 73A and 73B are plate-shaped members and can be easily formed by punching a plate material by pressing or the like. In addition, by being formed of a plate-shaped member, the accuracy of the plate thickness can be easily increased. Further, the spoke valves 71A, 71B, and 71C and the spacers 73A and 73B have no directivity to the front and back. Accordingly, during assembly, those can be stacked without concern for the front and back sides, and thus the assemblability of the valve body 70 is improved.

Next, the damping characteristics of the shock absorber 10 will be described below.

FIG. 8 is a diagram illustrating the damping characteristics of the shock absorber 10 according to the embodiment in the extension stroke. In FIG. 8, the horizontal axis represents a speed Vp of the piston 12 and the vertical axis represents a damping force.

As described above, the drive valve 61 has the step portion 61b, thereby forming the accommodation portion 61k. Then, the spoke valve 71A of the valve body 70 is accommodated in the accommodation portion 61k. Further, as described above, the orifice collar 80 has an upper end portion 81 and accommodates the spoke valve 71C of the valve body 70 in the upper end portion 81. This makes it possible to prevent the oil flowing from the second end 40b side to the first end 40a side from directly hitting the spoke valves 71A, 71B, and 71C in the extension stroke. As a result, even when the oil flows at a high flow rate from the second end 40b side to the first end 40a side, it is possible to prevent the flow of the oil which tries to enter between the spoke valves 71A, 71B, and 71C. As a result, a change in the pressure receiving area can be suppressed.

That is, in the extension stroke, the oil flows from the central axis C direction to the flow passage hole 56 as indicated by the arrow T5 in FIG. 4. In this case, the spoke valve 71A and the spoke valve 71C have a plurality of laminated plate members. Therefore, when no countermeasure is taken, oil may flow between the plate-shaped members from the inner peripheral side of the inner frame portion 75, and thus the pressure receiving area may increase. This is particularly noticeable when the piston 12 is displaced at high speed in the cylinder 11 and oil flows through the gap flow path 110 at high speed. In this case, the increase in the pressure receiving area causes the drag on the drive valve 61 to be extremely large, and thus the drive valve 61 is returned to the valve opening side, so that the gap of the second gap becomes wider. As a result, the damping force becomes extremely small.

On the other hand, in the embodiment, the spoke valve 71A and the spoke valve 71C are respectively accommodated in the accommodation portion 61k and the upper end portion 81. This makes it difficult for oil to enter between the plurality of plate-shaped members, so that the second gap described above can be kept narrow. As a result, the damping force when the Vp is large in the extension stroke can be made larger than the case of the related art.

FIG. 8 illustrates the damping characteristic when the urging force generated by the solenoid actuator 62 is the strongest (MAX) in the extension stroke. The damping characteristic when the step portion 61b is provided is shown by a solid line and the damping characteristic when the step portion 61b is not provided is shown by a dotted line.

As shown in the drawing, when the step portion 61b is provided, the damping force can be increased when the Vp is large. That is, the rise of the damping force is sharp. On the other hand, when the step portion 61b is not provided, even when the speed of the piston 12 becomes higher, the damping force does not become so large. That is, the rise of the damping force is slower than when the step portion 61b is provided.

In the example described above, the number of the spoke valves is three, that is, the spoke valve A, the spoke valve B, and the spoke valve C. However, the number of the spoke valves may be three or more. For example, a plurality of spoke valves B, which are second spoke valves located in the middle, may be provided.

FIGS. 9A to 9F are diagrams illustrating various shapes of the drive valve 61.

Figure 9A:
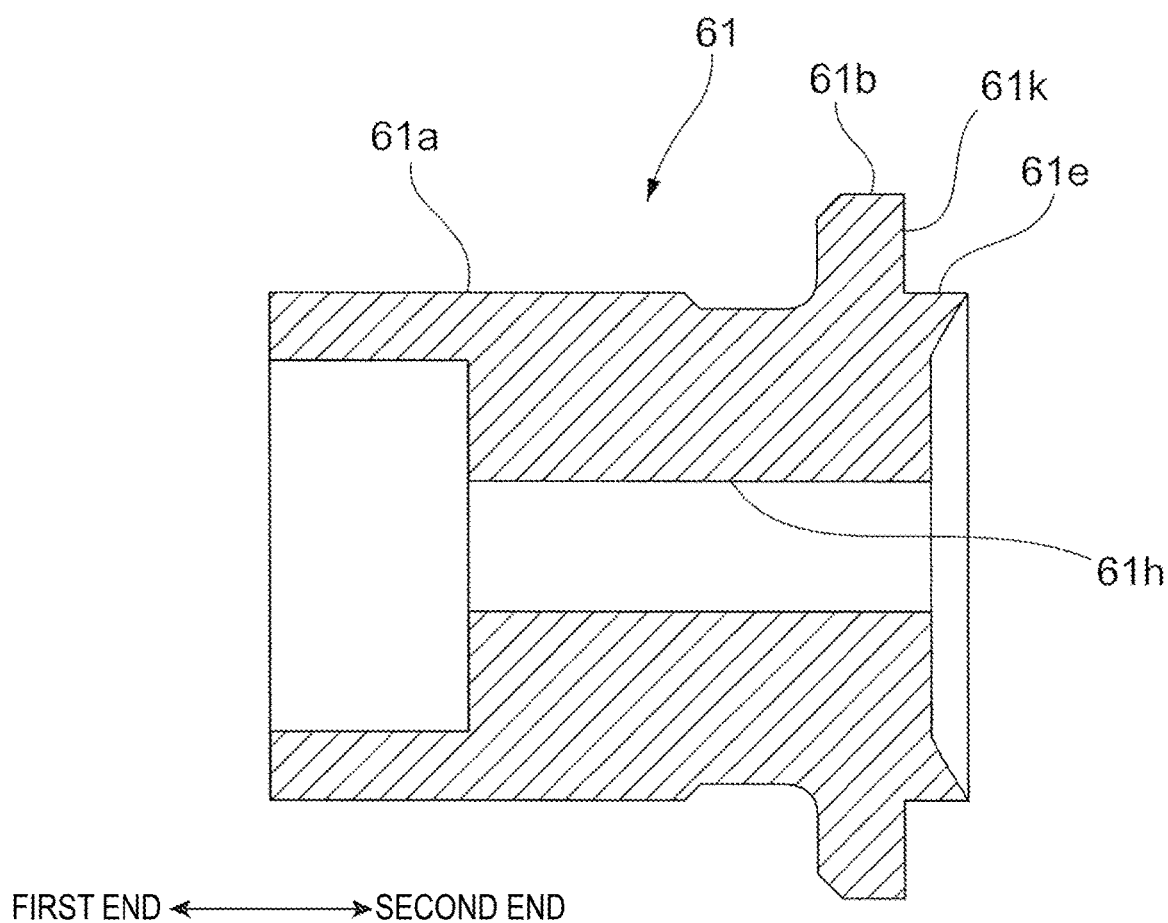
FIG. 9A is a view illustrating various shapes of the drive valve.

FIG. 9A shows the drive valve 61 illustrated in FIG. 4 and FIGS. 9B to 9F show examples of the drive valve 61 having a different shape.

Figure 9C:
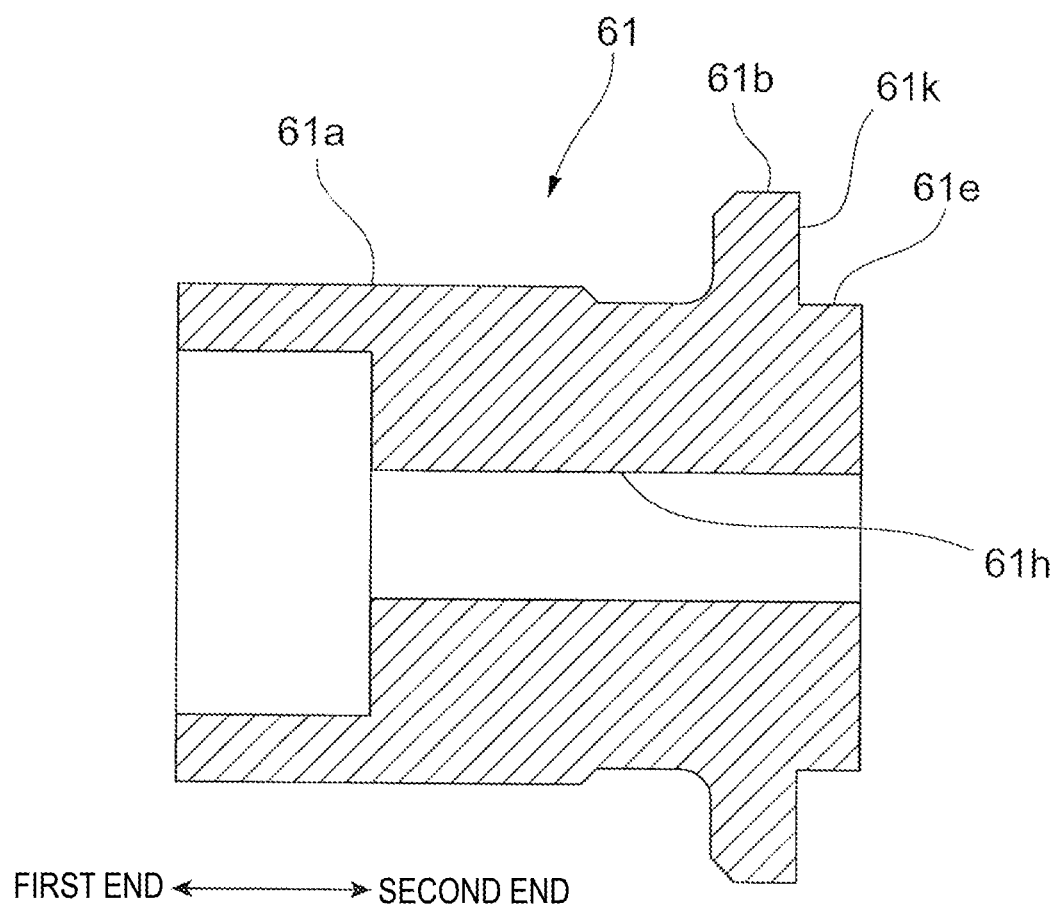
FIG. 9C is a view illustrating various shapes of the drive valve.

Here, the drive valves 61 in FIGS. 9B and 9C show a case where the shape of the tip portion 61e is changed.

Among them, FIG. 9B shows a case where the tip portion 61e has a tapered end portion on the second end 40b side. The end on the second end 40b side of the drive valve 61 illustrated in FIG. 9B has a larger inner diameter as approaching the second end 40b.

FIG. 9C shows a form where the tip portion 61e is a plane having the central axis C direction as the normal direction. The tip portion 61e of the drive valve 61 shown in FIG. 9C and the spoke valve 71B are in surface contact with each other.

Figure 9D:
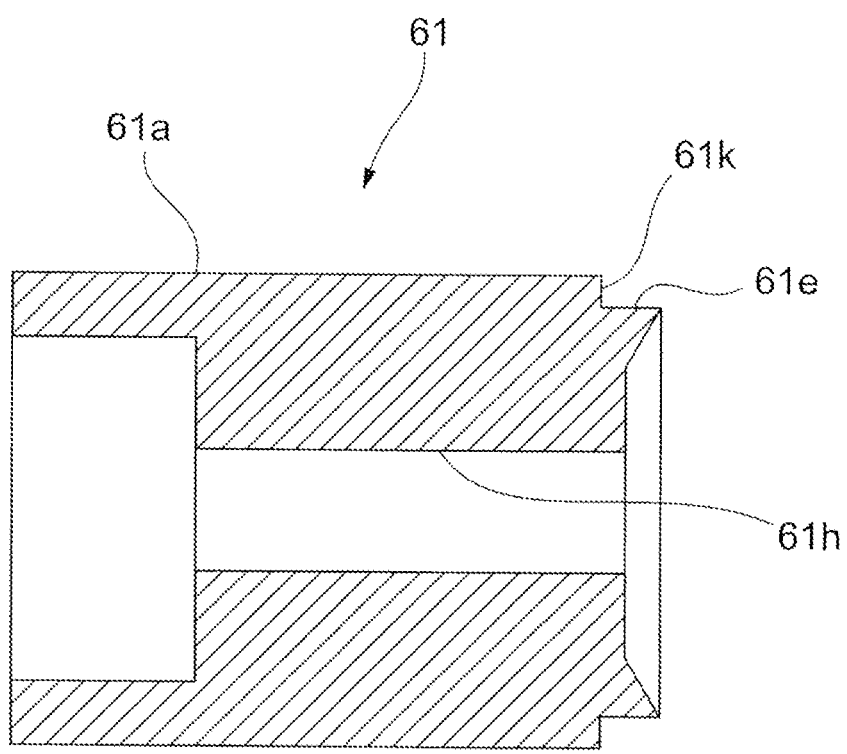
FIG. 9D is a view illustrating various shapes of the drive valve.
Figure 9E:
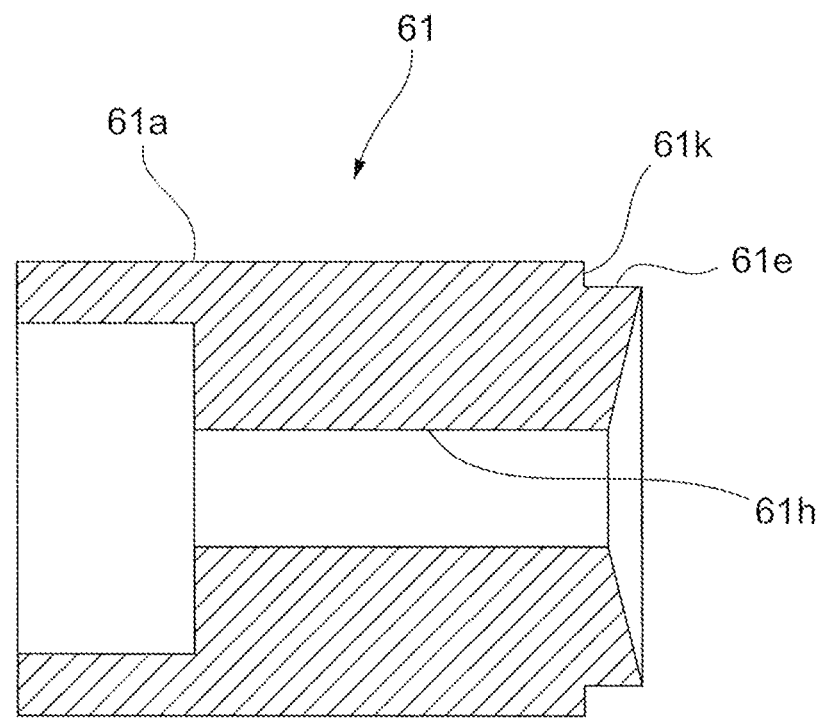
FIG. 9E is a view illustrating various shapes of the drive valve.
Figure 9F:
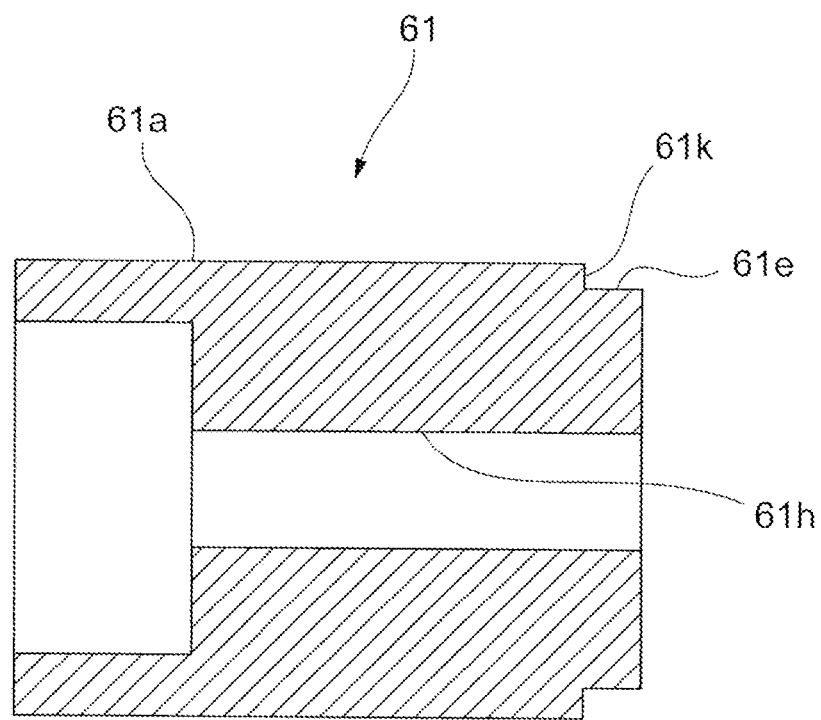
FIG. 9F is a view illustrating various shapes of the drive valve.

FIGS. 9D to 9F show a form in which an accommodation portion 61k is formed instead of the step portion 61b. That is, the drive valves 61 in FIGS. 9D to 9F respectively correspond to cases where the accommodation portions 61k are formed instead of the step portions 61b of the drive valves 61 shown in FIGS. 9A to 9C.

In the example described above, as illustrated in FIGS. 4, 7A, and 7B, when the solenoid actuator 62 does not generate thrust and the drive valve 61 is not pressed, the step portion 61b and the spoke valve 71A are in contact with each other. However, this is an example and the step portion 61b and the spoke valve 71A may not be in contact with each other when the drive valve 61 is not pressed. That is, the step portion 61b may be separated from the spoke valve 71A and a gap may be provided between the step portion 61b and the spoke valve 71A. When there is a gap between the step portion 61b and the spoke valve 71A, if the solenoid actuator 62 generates thrust, the drive valve 61 moves to the second end 40b side (orifice collar 80 side) and this makes the separated step portion 61b and the spoke valve 71A come into contact with each other. When the drive valve 61 moves to the orifice collar 80 side from this state, the spoke valve 71A is pressed by the step portion 61b, and thus the spoke valve 71A is elastically deformed. Further, when the drive valve 61 moves toward the orifice collar 80 side, the tip portion 61e comes into contact with the spoke valve 71B. Then, the tip portion 61e presses the spoke valve 71B and the spoke valve 71B elastically deforms toward the orifice collar 80 side.

REFERENCE SIGNS LIST

10: shock absorber
11: cylinder
12: piston
13: piston rod
42: main damper (example of damping force generation mechanism)
60: control valve portion (example of valve mechanism)
61: drive valve
61b: step portion
61e: tip portion
61h: flow path
61j: shaft portion
61k: accommodation portion
70: valve body
71A, 71B, 71C: spoke valve (example of a plurality of valve bodies)
72S: spoke portion
73A, 73B: spacer
74: outer frame portion
75: inner frame portion
80: orifice collar (example of cylindrical body)
81: upper end portion
82: through-hole (example of hollow portion)
82M: middle through-hole (example of orifice portion)
S3: oil reservoir

What is claimed is:
1. A valve mechanism, comprising:
a cylindrical body having a hollow portion penetrating in an axial direction;
a plurality of valve bodies including a first valve body having a through-hole penetrating in the axial direction and being arranged to be in contact with an axial end surface of the cylindrical body; and
a drive valve arranged movably in the axial direction and disposed on a side opposite to the cylindrical body with respect to the plurality of valve bodies, wherein
the drive valve includes,
a shaft portion having therein a flow path penetrating in the axial direction, and
a step portion extending from an outer peripheral surface of the shaft portion to a radially outward portion of the shaft portion,
the shaft portion has a tip portion which extends further on the cylindrical body side than the step portion, an outer diameter of the tip portion is smaller than an outer diameter of the step portion, a gap between the plurality of valve bodies is changed by elastically deforming an inner periphery of the valve body, which comes into contact with the drive valve which is moved in a direction approaching the valve body, in a direction approaching the cylindrical body with respect to an outer peripheral portion of the valve body, the step portion is in contact with a second valve body which is included in the plurality of valve bodies and disposed closest to the drive valve side, and the plurality of valve bodies includes a third valve body which is arranged further on the cylindrical body side than the second valve body and is configured to contact the tip portion.

2. The valve mechanism according to claim 1, wherein a spacer is provided between the first valve body and the second valve body.

3. The valve mechanism according to claim 2, wherein the tip portion has an annular recess portion on an end surface on the cylindrical body side.

4. The valve mechanism according to claim 2, wherein the step portion has an annular shape.

5. The valve mechanism according to claim 2, wherein the hollow portion has an orifice portion of which inner diameter increases as it approaches the valve body.

6. The valve mechanism according to claim 2, wherein the cylindrical body has an upper end portion which is in contact with the third valve body.

7. The valve mechanism according to claim 2, wherein the valve body has an annular outer frame portion, an annular inner frame portion arranged radially inward of the outer frame portion, and a plurality of spoke portions connecting the outer frame portion and the inner frame portion and the plurality of spoke portions are spaced apart from each other.

8. The valve mechanism according to claim 2, wherein the plurality of valve bodies are three or more valve bodies.

9. A shock absorber, comprising:
the valve mechanism according to claim 2;
a cylinder which accommodates fluid;
a piston which is slidably fitted in the cylinder;
a piston rod which is connected to the piston and extends out of the cylinder; and
an oil reservoir for compensating for an oil amount corresponding to an entering volume of the piston rod when the piston rod enters the cylinder, wherein
the fluid flowing due to the sliding of the piston moves into the valve mechanism to generate a damping force and the fluid having passed through the valve mechanism can flow through the oil reservoir.

10. The shock absorber according to claim 9, further comprising:

a damping force generating mechanism which is provided independently of the valve mechanism and generates a damping force due to the flow of the fluid, wherein
the fluid which has passed through the damping force generating mechanism can flow through the oil reservoir.

11. The valve mechanism according to claim 1, wherein the tip portion has an annular recess portion on an end surface on the cylindrical body side.

12. The valve mechanism according to claim 11, wherein the step portion has an annular shape.

13. The valve mechanism according to claim 11, wherein the hollow portion has an orifice portion of which inner diameter increases as it approaches the valve body.

14. The valve mechanism according to claim 1, wherein the step portion has an annular shape.

15. The valve mechanism according to claim 1, wherein the hollow portion has an orifice portion of which inner diameter increases as it approaches the valve body.

16. The valve mechanism according to claim 1, wherein the cylindrical body has an upper end portion which is in contact with the third valve body.

17. The valve mechanism according to claim 1, wherein the valve body has an annular outer frame portion, an annular inner frame portion arranged radially inward of the outer frame portion, and a plurality of spoke portions connecting the outer frame portion and the inner frame portion and the plurality of spoke portions are spaced apart from each other.

18. The valve mechanism according to claim 1, wherein the plurality of valve bodies are three or more valve bodies.

19. A shock absorber, comprising:
the valve mechanism according to claim 1;
a cylinder which accommodates fluid;
a piston which is slidably fitted in the cylinder;
a piston rod which is connected to the piston and extends out of the cylinder; and
an oil reservoir for compensating for an oil amount corresponding to an entering volume of the piston rod when the piston rod enters the cylinder, wherein
the fluid flowing due to the sliding of the piston moves into the valve mechanism to generate a damping force and the fluid having passed through the valve mechanism can flow through the oil reservoir.

20. The shock absorber according to claim 19, further comprising:
a damping force generating mechanism which is provided independently of the valve mechanism and generates a damping force due to the flow of the fluid, wherein
the fluid which has passed through the damping force generating mechanism can flow through the oil reservoir.

* * * * *